(12) United States Patent
Yamamura

(10) Patent No.: US 8,797,651 B2
(45) Date of Patent: Aug. 5, 2014

(54) LENS ARRAY, LENS UNIT, LED HEAD, EXPOSURE UNIT, IMAGE FORMATION APPARATUS, READING APPARATUS, MOLD FOR MOLDING LENS ARRAY, AND METHOD FOR MANUFACTURING LENS ARRAY

(75) Inventor: Akihiro Yamamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 124 days.

(21) Appl. No.: 13/548,531

(22) Filed: Jul. 13, 2012

(65) Prior Publication Data

US 2013/0021672 A1 Jan. 24, 2013

(30) Foreign Application Priority Data

Jul. 21, 2011 (JP) .................................. 2011-160165

(51) Int. Cl.
*G02B 27/10* (2006.01)
*G02B 3/00* (2006.01)

(52) U.S. Cl.
CPC .................................. *G02B 3/0056* (2013.01)
USPC .......................... 359/619; 359/621; 359/624

(58) Field of Classification Search
USPC ........................................ 359/619, 621, 624
See application file for complete search history.

(56) References Cited

U.S. PATENT DOCUMENTS

2007/0221826 A1* 9/2007 Bechtel et al. ............. 250/208.1

FOREIGN PATENT DOCUMENTS

JP 2008-092006 A 4/2008

* cited by examiner

*Primary Examiner* — William Choi
(74) *Attorney, Agent, or Firm* — Marvin A. Motsenbocker; Mots Law, PLLC

(57) ABSTRACT

A lens array includes: at least one lens including a first lens surface and a second lens surface. The first lens surface is formed to tilt at a predetermined tilt angle with respect to the second lens surface. The first lens surface is formed to be eccentric by an eccentric distance in such a direction that the optical axis of the second lens surface and an optical axis of the first lens surface intersect on a side of the first lens surface.

16 Claims, 19 Drawing Sheets

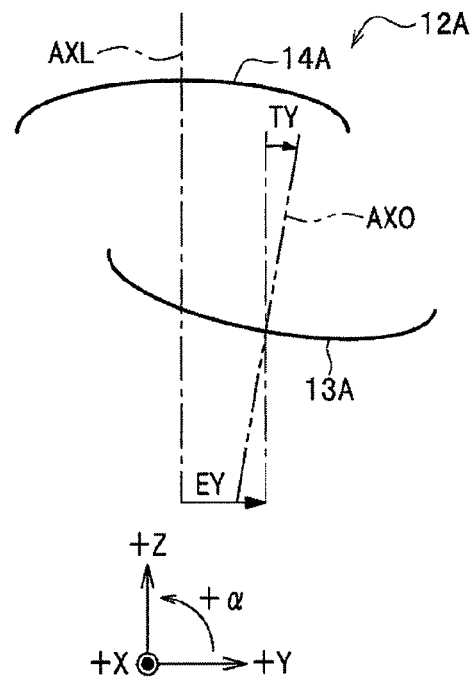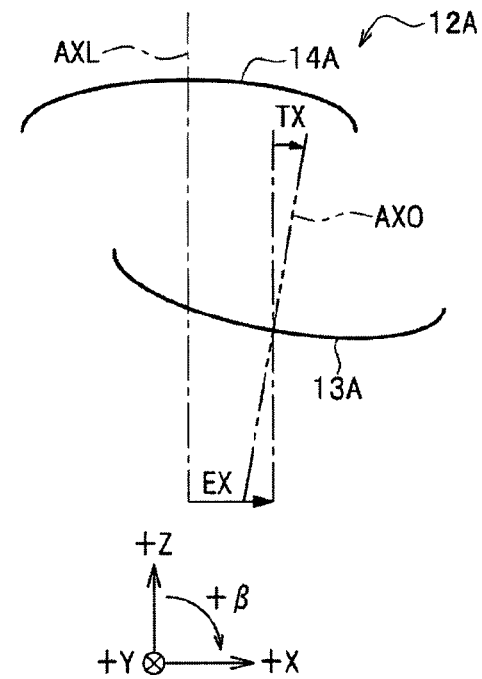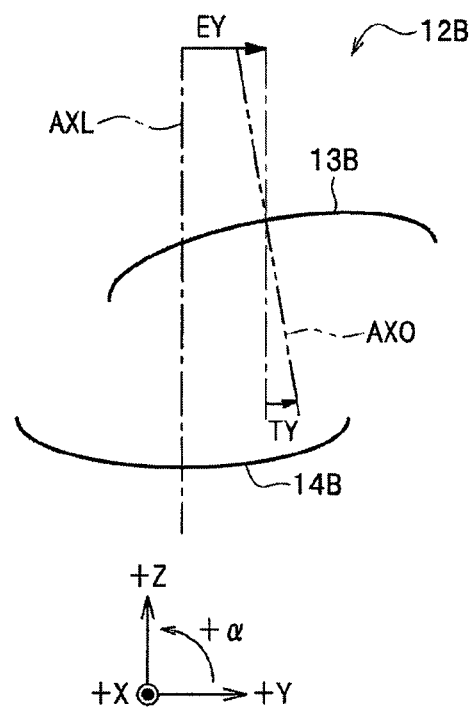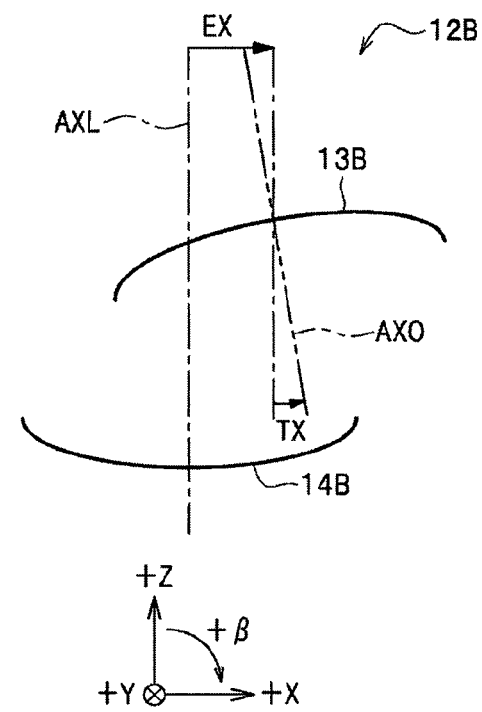

LENS ARRAY, LENS UNIT, LED HEAD, EXPOSURE UNIT, IMAGE FORMATION APPARATUS, READING APPARATUS, MOLD FOR MOLDING LENS ARRAY, AND METHOD FOR MANUFACTURING LENS ARRAY

CROSS REFERENCE TO RELATED APPLICATIONS

This application claims priority based on 35 USC 119 from prior Japanese Patent Application No. 2011-160165 filed on Jul. 21, 2011, entitled "LENS ARRAY, LENS UNIT, LED HEAD, EXPOSURE UNIT, IMAGE FORMATION APPARATUS, READING APPARATUS, MOLD FOR MOLDING LENS ARRAY, AND METHOD FOR MANUFACTURING LENS ARRAY", the entire contents of which are incorporated herein by reference.

BACKGROUND OF THE INVENTION

1. Field of the Invention

This disclosure relates to a lens array in which lenses are arranged, a lens unit, an LED head, an exposure unit, an image formation apparatus, a reading apparatus, a mold for molding a lens array, and a method for manufacturing a lens array.

2. Description of Related Art

Image formation apparatuses include a printer, a copier, a facsimile machine, a multi function printer (MFP) having a printer unit and a scanner unit, and the like. Reading apparatuses include a copier, a facsimile machine, a scanner, an MFP having a printer unit and a scanner unit, and the like.

An optical system configured to form a same-size erect (non-inverted) image of an object in the form of a line is used in an electrophotographic image formation apparatus using an LED head in which Light Emitting Diode (LED) elements are arranged in an array, or is used in a reading apparatus, such as a scanner or a facsimile machine, configured to form an image of an original document on a light reception unit having photo acceptance elements arranged in an array. Here, the optical system to form a high-resolution same-size erect image from an LED array can have such a configuration that sets of biconvex lenses opposed to each other are arranged substantially linearly to form an a same-size erect image of an object (for example, see Japanese Patent Application Publication No. 2008-92006; paragraphs 0030 to 0078).

SUMMARY OF THE INVENTION

The conventional optical system (lens array) is formed by injecting a resin into a mold in a single direction. Thus, an optical axis of a lens may be tilted due to inner stress during the cooling, and therefore the resolution of the conventional optical system (lens array) may be lowered. Hence, the image formation apparatus using the conventional optical system (lens array) has a problem that a print image has a streak and density irregularity. Meanwhile, the reading apparatus using the conventional optical system (lens array) has a problem that image data accurately corresponding to an original document cannot be formed.

An object of an embodiment of the invention is to prevent a reduction or lowering of the resolution.

An aspect of the invention is a lens array including a lens. The lens includes a first lens surface and a second lens surface. The first lens surface is formed to tilt at a predetermined tilt angle with respect to the second lens surface. The first lens surface is formed to be eccentric by an eccentric distance in such a direction that the optical axis of the second lens surface and an optical axis of the first lens surface intersects on a side of the first lens surface.

According to the aspect, resolution can be prevented from lowering.

BRIEF DESCRIPTION OF THE DRAWINGS

FIG. 7 are schematic cross-sectional views of micro lenses according to the first embodiment. FIG. 7A is a schematic cross-sectional view taken along an arrangement direction (Y direction) of micro lenses formed on a first lens plate; FIG. 7B is a schematic cross-sectional view taken along a width direction (X direction) of the micro lenses formed on the first lens plate; FIG. 7C is a schematic cross-sectional view taken along an arrangement direction (Y direction) of micro lenses formed on a second lens plate; and FIG. 7D is a schematic cross-sectional view taken along a width direction (X direction) of the micro lenses formed on the second lens plate.

FIG. 11 are diagrams illustrating an operation of a micro lens according to the first embodiment.

DETAILED DESCRIPTION OF EMBODIMENTS

Figure 1:
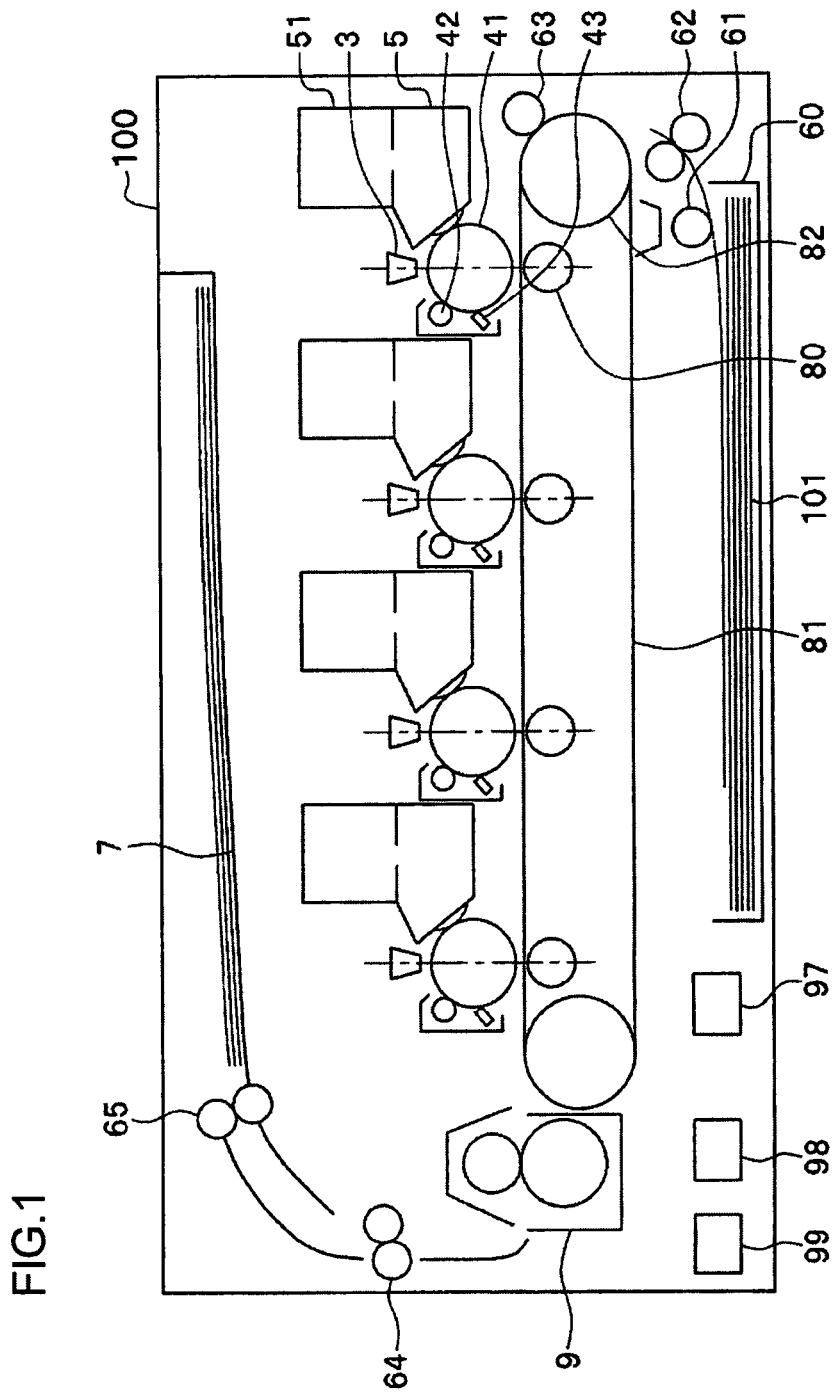
FIG. 1 is a vertical cross-sectional view of an image formation apparatus according to a first embodiment.

Descriptions are provided hereinbelow in detail on embodiments of the invention based on the drawings. The invention is merely schematically illustrated in the drawings to be sufficiently understood. Thus, the invention is not limited to the examples illustrated in the drawings. In the drawings referenced herein, dimensions of members forming the invention are emphasized for the sake of clear description. Furthermore, in the drawings, the same or similar constituents are designated by the same reference numerals and duplicate explanation concerning the same constituents is omitted.

First Embodiment

Configuration of Image Formation Apparatus

First of all, the configuration of image formation apparatus 100 according to a first embodiment is described with reference to FIG. 1, which is a vertical cross-sectional view of image formation apparatus 100 according to the first embodiment.

Image formation apparatus 100 according to the first embodiment is, for example, a printer, a copier, a facsimile machine, a scanner, an MFP including a printer unit and a scanner unit, or the like. Here, the description is given assuming that image formation apparatus 100 is a color electrophotographic printer. Image formation apparatus 100 may be hereinafter also referred to as "printer 100".

Printer 100 forms an image on a print medium in accordance with input image data using a toner made of a resin that contains a pigment as a coloring material. Printer 100 includes removable paper cassette 60 configured to store a stack of paper 101 as the print media. Printer 100 also includes: feed roller 61 configured to pick up paper 101 from paper cassette 60; and transport rollers 62 and 63 configured to transport paper 101.

Printer 100 includes image formation units. Each of the image formation units includes: photoconductive drum 41 serving as an electrostatic latent image carrier; charging roller 42 configured to supply electric charges and thereby to electrically charge a surface of photosensitive drum 41; LED head 3 as an exposure unit configured to selectively irradiate the charged surface of photoconductive drum 41 with light in accordance with image data (print data), thereby forming an electrostatic latent image thereon; developer 5 configured to develop a toner image of a corresponding one of yellow, magenta, cyan, and black on photoconductive drum 41 by visualizing the electric latent image formed on photosensitive drum 41 with toner; toner cartridge 51 configured to supply the toner to developer 5; and cleaning blade 43 disposed to be in contact with photoconductive drum 41 and configured to scrape the residual toner off the surface of photoconductive drum 41. The image formation units of printer 100 are arranged along a transport path of paper 101.

Figure 2:
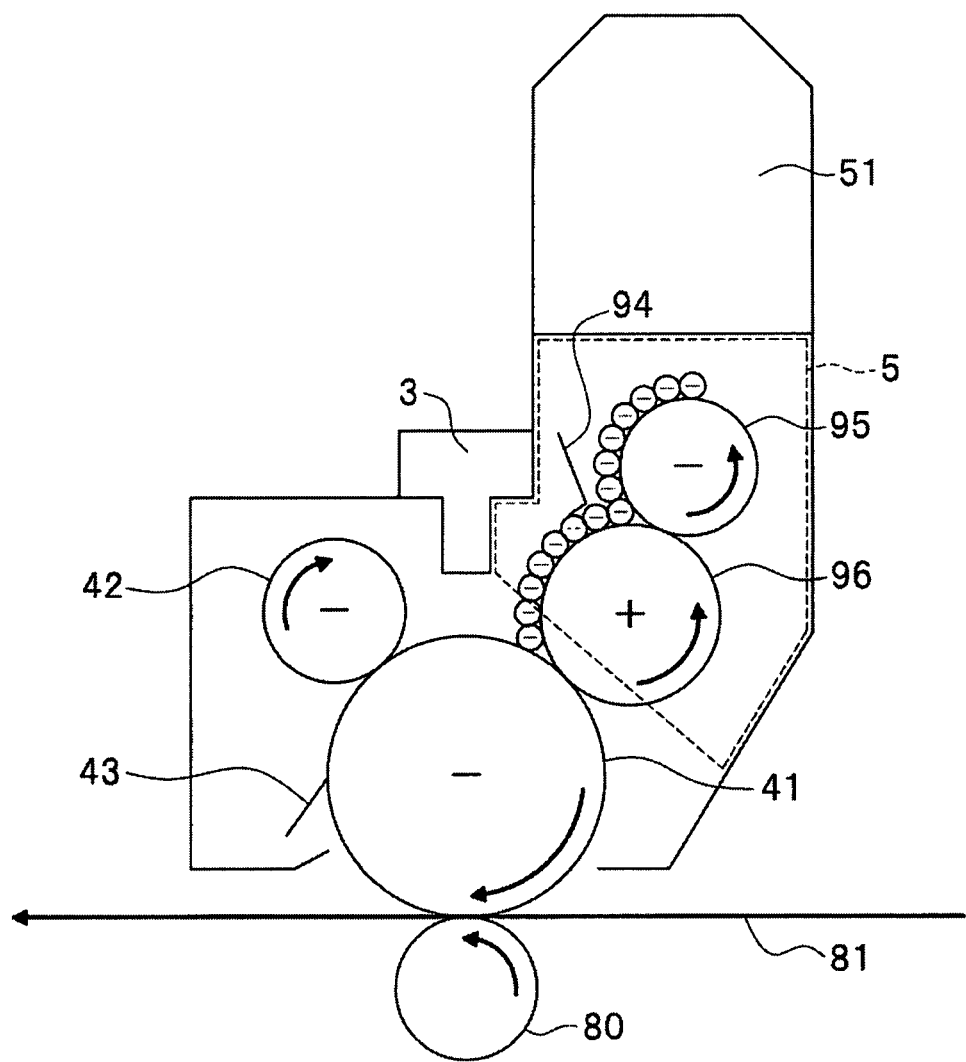
FIG. 2 is an enlarged vertical cross-sectional view of the image formation apparatus according to the first embodiment.

Referring to FIG. 2, a configuration of developer 5 is described. FIG. 2 is an enlarged vertical cross-sectional view of image formation apparatus 100 according to the first embodiment. Developer 5 includes: supplying roller 95 configured to charge the toner as a developing agent in toner cartridge 51 in response to an application of a negative bias voltage (e.g., −300V) thereto, and supply the negatively charged toner to developing roller 96; developer blade 94 configured to form a thin layer of the toner supplied to development roller 96 to thereby form a uniform toner layer on a surface of developing roller 96; and developing roller 96 to which a negative bias voltage (e.g., −200V) is applied, and configured to move the negatively charged toner onto an electrostatic latent image with an effect of an electric field.

Referring back to FIG. 1, the configuration of printer 100 is further described. Printer 100 includes transfer belt 81 configured to transport paper 101 and transfer rollers 80 each configured to transfer a toner image formed on photoconductive drum 41 onto paper 101. Each transfer roller 80 is disposed opposite to photoconductive drum 41 in such a manner that transfer belt 81 is sandwiched therebetween, and is charged with a positive voltage. Printer 100 further includes: fixation unit 9 configured to fix the toner image formed on paper 101 by application of heat and pressure; transport roller 64 configured to transport paper 101 after passage of fixation unit 9; discharge portion 7 which stores paper 101 on which the image is formed; and discharge rollers 65 configured to discharge paper 101 to discharge portion 7.

Printer 100 further includes: power supply 99 configured to apply predetermined voltages to thereby drive the units in printer 100, such as photoconductive drums 41, charging rollers 42, transfer rollers 80, and transfer belt 81; controller 98 configured to control the drive of the units; and external interface 97 configured to receive print data from an external apparatus.

<Exposure Unit>

Figure 3:
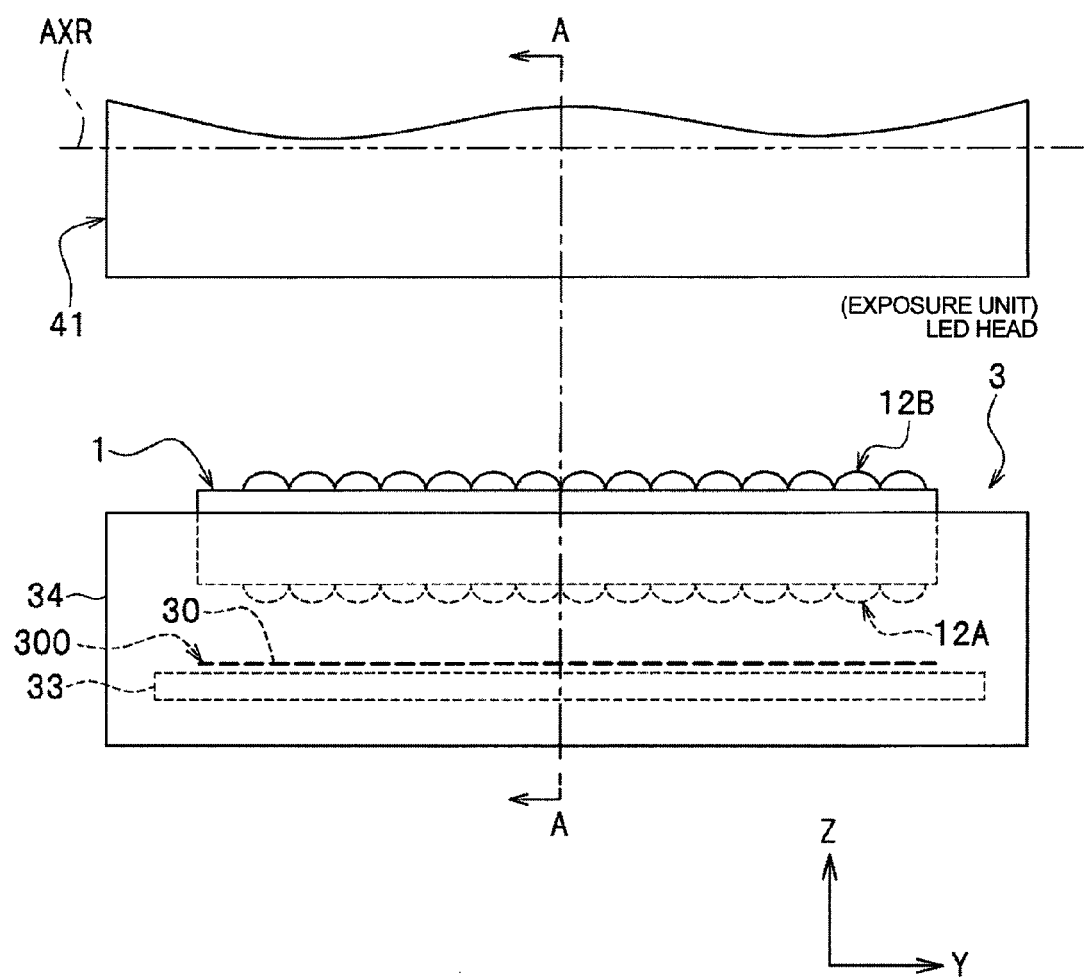
FIG. 3 is a side view of an exposure unit according to the first embodiment.
Figure 4:
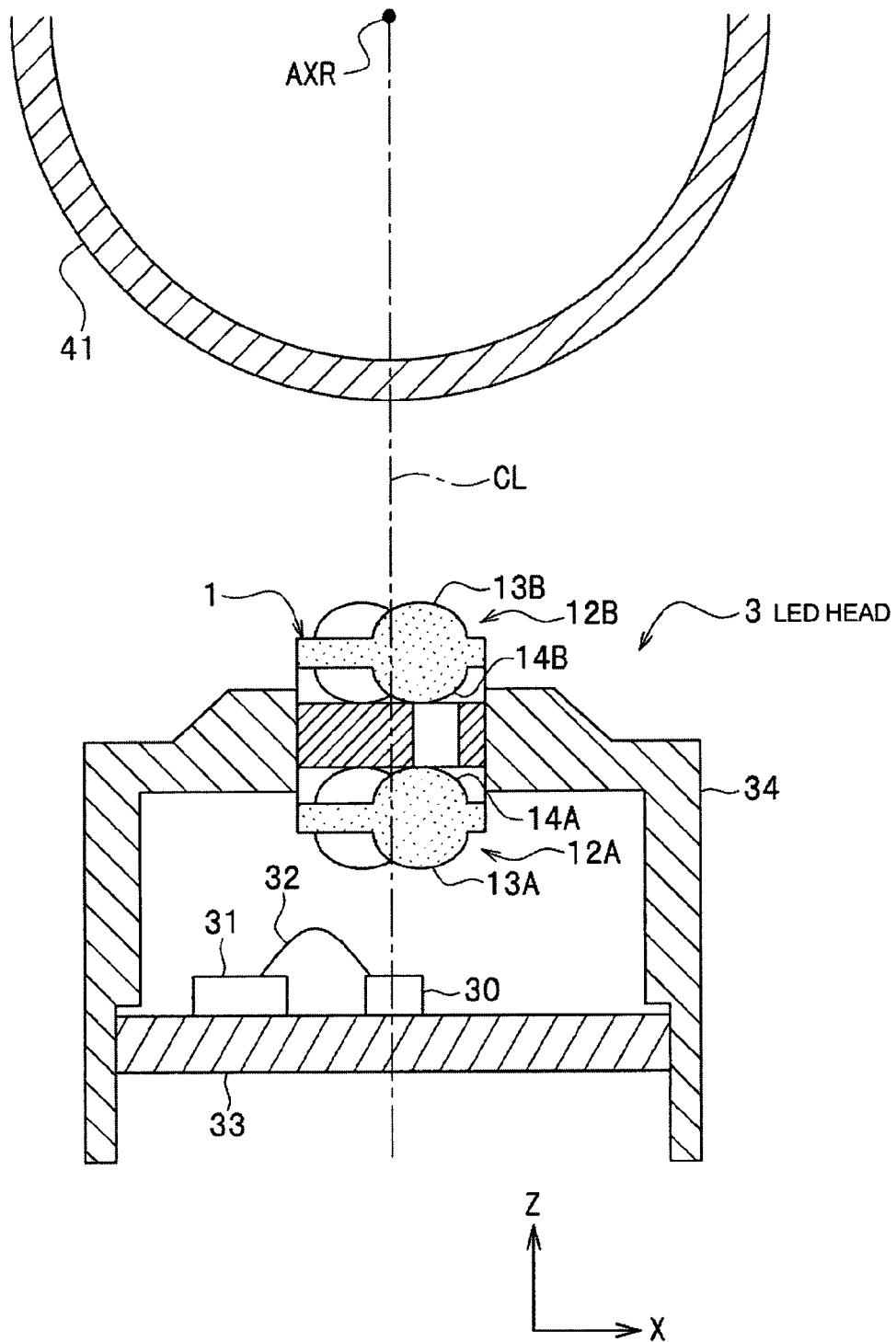
FIG. 4 is a vertical cross-sectional view of the exposure unit according to the first embodiment.

Next, a configuration of exposure unit 3 according to the first embodiment is described with reference to FIG. 3 and FIG. 4. In this embodiment, the description is given assuming an LED head as exposure unit 3. Exposure unit 3 may be hereinafter also referred to as "LED head 3". FIG. 3 is a side view of LED head 3 according to the first embodiment. FIG. 4 is a vertical cross-sectional view of LED head 3 according to the first embodiment taken along the A-A direction. In FIG. 3 and FIG. 4, for the description of an arrangement of LED head 3, photoconductive drum 41 is drawn on the same plane. To further facilitate the description, a positional relationship between LED head 3 and photoconductive drum 41 is vertically reversed from that in FIG. 1. Reference numeral AXR denotes the rotational axis of photoconductive drum 41. Rotational axis AXR is in the Y direction (lateral direction in FIG. 3).

As illustrated in FIG. 3, LED head 3 includes LED array 300 and lens unit 1.

(LED Array)

LED array 300 includes LED elements 30 as light emitting units arranged substantially linearly on circuit board 33. LED elements 30 are arranged in a direction parallel with rotational axis AXR of photoconductive drum 41. Thus, LED elements 30 are arranged in the Y direction (lateral direction in FIG. 3) which is also the direction of rotational axis AXR of photoconductive drum 41. LED element 30 is connected to driver IC 31 through wire 32 (see FIG. 4), and emits light at a predetermined light intensity in accordance with an instruction from driver IC 31. The light emitted by LED element 30 is incident on lens unit 1.

(Lens Unit)

Lens unit 1 has an elongated shape, and a longitudinal direction thereof is parallel to the arrangement direction (Y direction) of LED elements 30 in LED array 300. Lens unit 1 is fixed at a relevant position with holder 34. Lens unit 1 includes first micro lenses 12A on a surface facing LED array 300 and second micro lenses 12B on a surface facing photoconductive drum 41 and opposite to the surface on which first micro lenses 12A are disposed. The number of first micro lenses 12A and the number of second micro lenses 12B are the same.

Here, in first micro lens 12A, a lens surface on the side of LED elements 30 as light emitting units is referred to as "outer lens surface 13A" as a first lens surface, and a lens surface on the side of photoconductive drum 41 on which an image is formed is referred to as "inner lens surface 14A" as a second lens surface. In second micro lens 12B, a lens surface on the image side is referred to as "outer lens surface 133" as a first lens surface, and a lens surface on the side of the light emitting units is referred to as "inner lens surface 14B" as a second lens surface. Here, lens unit 1 is used in LED head 3 of printer 100. Thus, an object as a projection target of lens unit 1 is LED element 30 as the light emitting unit. Thus, LED element 30 may be hereinafter referred to as "light emitting unit" and "object". Specifically, the object as the projection target to be described in comparison with an image projected by lens unit 1 is simply referred to as "object". If lens unit 1 is used in an optical system of a reading apparatus, the projection target of lens unit 1 is an image formed on a surface of a medium to be read.

While detail configurations of first micro lens 12A and second micro lens 12B are described later, optical axes of outer lens surface 13A and inner lens surface 14A are shifted from one another, and outer lens surface 13A is tilted with respect to inner lens surface 14A. Similarly, optical axes of outer lens surface 13B and inner lens surface 14B are shifted from one another, and outer lens surface 13B is tilted with respect to inner lens surface 14B. The optical axes of inner lens surface 14A and inner lens surface 14B coincide with one another. Lens unit 1 is configured in such a manner that optical axes of inner lens surface 14A and inner lens surface 14B are in the Z direction (vertical direction in FIG. 4).

If the width direction of lens unit 1 is defined as a direction orthogonal to both the longitudinal direction (Y direction) of lens unit 1 and the optical axis direction of inner lens surfaces 14A and 14B of respective micro lenses 12A and 12B, the width direction of lens unit 1 is in the X direction (lateral direction in FIG. 4). As illustrated in FIG. 4, assuming that a reference numeral CL represents the center line of the width direction (X direction) of lens unit 1, LED element 30 and rotational axis AXR of photoconductive drum 41 are disposed on a straight line denoted by reference numeral CL.

Figure 5:
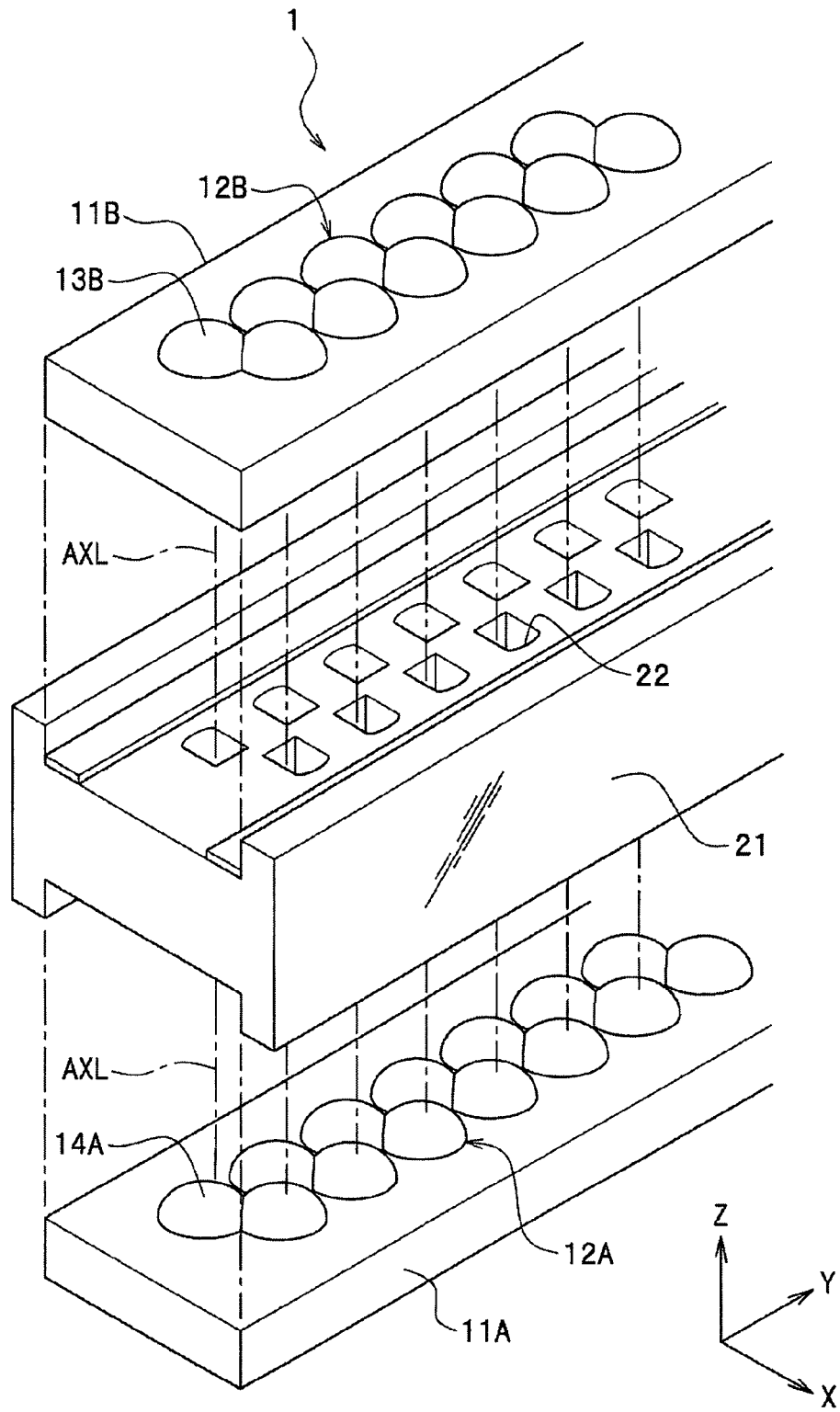
FIG. 5 is an external perspective view of a lens unit according to the first embodiment.

Next, the configuration of lens unit 1 according to the first embodiment is described with reference to FIG. 5. FIG. 5 is an external perspective view of lens unit 1 according to the first embodiment. Lens unit 1 includes first lens plate 11A as a lens array on the object side (side of LED array 300), second lens plate 11B as a lens array on the image side (side of photoconductive drum 41), and light-shield plate 21. First lens plate 11A and second lens plate 11B are disposed opposed to each other with light-shield plate 21 disposed in between.

(Lens Array)

First lens plate 11A and second lens plate 11B as the lens arrays may be made of any material that transmits light rays from LED elements 30 (see FIG. 4) as the light emitting units. In this embodiment, first lens plate 11A and second lens plate 11B are each made of a cycloolefin optical resin, or namely, ZEONEX (registered trademark) E48R (manufactured by Zeon Corporation). First lens plate 11A is integrally molded with first micro lenses 12A by injection molding. Second lens plate 11B is integrally molded with second micro lenses 12B by injection molding. First micro lens 12A and second micro lens 12B each have a substantially convex lens shape (substantially biconvex shape).

Optical axes AXL of inner lens surface 14A of first micro lens 12A and inner lens surface 14B of second micro lens 12B are in the Z direction (vertical direction in FIG. 4) and coincide with one another (see FIG. 4). Thus, first micro lenses 12A and second micro lens 12B are arranged at the same intervals.

Figure 6:
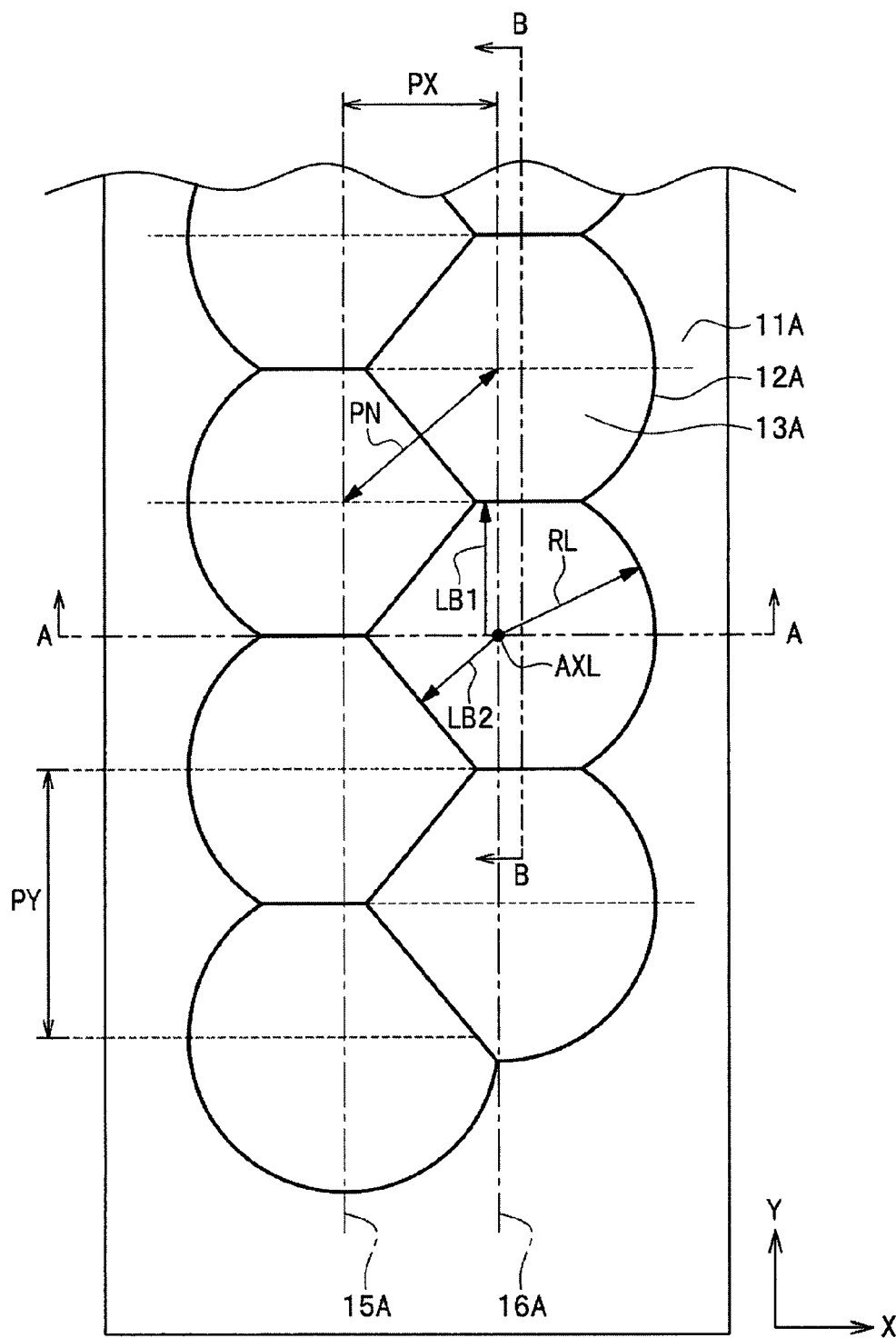
FIG. 6 is a bottom view of a lens array according to the first embodiment.

The arrangement of micro lenses 12A and 12B is described with reference to FIG. 6. FIG. 6 is a bottom view of micro lenses 12A as the lens array according to the first embodiment. Lens unit 1 according to the first embodiment includes two lens arrays of first lens plate 11A and second lens plate 11B. Since micro lenses 12A formed on first lens plate 11A and second micro lenses 12B formed on second lens plate 11B are arranged in the same way, first lens plate 11A is described herein and the detail description of second lens plate 11B is omitted.

First micro lenses 12A are preferably arranged in a zigzag pattern of two rows in the X direction as illustrated in FIG. 6. The zigzag pattern of first micro lenses 12A allows the lenses to be arranged most densely. One of the rows of first micro lenses 12A arranged on first lens plate 11A is referred to as first lens row 15A, while the other one of the rows of first micro lenses 12A is referred to as second lens row 16A. A pitch between first lens row 15A and second lens row 16A is PX.

First micro lenses 12A in first lens row 15A are arranged in the longitudinal direction of first lens plate 11A (Y direction) at pitch PY. First micro lenses 12A in second lens row 16A are arranged in the longitudinal direction of first lens plate 11A (Y direction) at pitch PY. In addition, a pitch between two adjacent micro lenses 12A located on first row 15A and second row 16A is PN.

Outer lens surface 13A of one micro lens 12A formed on first lens plate 11A is in contact with outer lens surface 13A of micro lens 12A adjacent thereto while sharing the border line. Thus, outer lens surfaces 13A are continuously arranged without any spaces, and define the borderline in a saw-tooth shape. Thus, radius LB1 of outer lens surface 13A in the arrangement direction (Y direction) is PY/2. Radius LB2 of outer lens surface 13A, in a direction connecting the centers of one first micro lens 12A in first lens row 15A and an adjacent first micro lens 12A in second lens row 16A, is PN/2. Maximum radius RL of outer lens surface 13A is larger than LB1 and LB2.

Next, detail configurations of first micro lens 12A and second micro lens 12B are described with reference to FIG. 7. FIG. 7 is a schematic cross-sectional view of micro lenses 12A and 12B according to the first embodiment. FIG. 7A is a schematic cross-sectional view of first micro lens 12A formed on first lens plate 11A, taken along the arrangement direction (Y direction). FIG. 7B is a schematic cross-sectional view of first micro lens 12A formed on first lens plate 11A, taken along the width direction (X direction). FIG. 7C is a schematic cross-sectional view of second micro lens 12B formed on second lens plate 11B, taken along the arrangement direction (Y direction). FIG. 7D is a schematic cross-sectional view of second micro lens 12B formed on second lens plate 11B, taken along the width direction (X direction).

First of all, configurations of curved surfaces of micro lenses 12A and 12B are described. Each of outer lens surface 13A and inner lens surface 14A of first micro lens 12A, as well as outer lens surface 13B and inner lens surface 14B of second micro lens 12B, is formed as a rotationally symmetrical high order aspheric surface defined by the following Numerical Expression 1. Thus, a high resolution can be achieved.

[Numerical Expression 1]

$$Z(r) = \frac{\frac{r^2}{CR}}{1+\sqrt{1-\left(\frac{r}{CR}\right)^2}} + Ar^4 + Br^6 + Cr^8 \qquad \text{Formula 1}$$

Function Z(r) in Numerical Expression 1 expresses a direction from an object plane to an image plane with an apex of outer lens surfaces 13A and of inner lens surfaces 13B of first micro lens 12A, as well as of outer lens surfaces 13B and of inner lens surfaces 13B of first micro lens 12B, as an origin. The function defines such a direction by using a positive value. The value r represents a rotating system of coordinates in the radial direction while defining the direction parallel to the optical axis of each of micro lens 12A and 12B as an axis. r has a relationship with respective coordinates in the X and Y directions shown in the drawings, which is defined by the following Numerical Expression 2. CR denotes a curvature radius, A denotes a fourth-order aspheric coefficient, B denotes a sixth-order aspheric coefficient, and C denotes an eighth-order aspheric coefficient.

[Numerical Expression 2]

$$r = \sqrt{X^2 + Y^2} \qquad \text{Formula 2}$$

Next, eccentricity and tilting of optical axes of micro lenses 12A and 12B are described.

FIG. 7A illustrates a cross-sectional configuration of first micro lens 12A. The lateral direction (Y direction) in FIG. 7A is the arrangement direction of micro lenses 12A. Optical axis AXL of inner lens surface 14A on the image side is in the longitudinal direction (Z direction) in FIG. 7A. Outer lens surface 13A as the first lens surface is disposed below inner lens surface 14A as the second lens surface. LED element 30 (see FIG. 3) as the object is disposed on the lower side in FIG. 7A. Arrow EY represents a shift (eccentricity) of optical axis AXO of outer lens surface 13A on the object side toward the Y direction with respect to optical axis AXL of inner lens surface 14A on the image side. Arrow TY represents the tilting of the optical axis AXO of outer lens surface 13A on the object side toward the Y direction with respect to optical axis AXL of inner lens surface 14A on the image side.

Here, in a right-handed XYZ coordinate system, the Y direction is the arrangement direction of first micro lenses 12A, +Z direction is a direction from the object to the image, and +α (α being a number not smaller than zero) represents a direction in a clockwise rotation around the +X direction axis as a positive tilt. First micro lens 12A is configured in such a manner that eccentricity EY of outer lens surface 13A is in the −Y direction when the tilt TY of outer lens surface 13A is in the +α direction, and eccentricity EY is in the +Y direction when tilt TY is in −α direction.

FIG. 7B illustrates a cross-sectional configuration of first micro lens 12A. The lateral direction (X direction) in FIG. 7B is the width direction of lens unit 1. The longitudinal direction (Z direction) in FIG. 7B is the direction of optical axis AXL of inner lens surface 14A on the image side. Outer lens surface 13A as the first lens surface is disposed below inner lens surface 14A as the second lens surface. LED element 30 (see FIG. 3) as the object is disposed on the lower side in FIG. 7B. Arrow EX represents a shift (eccentricity) of optical axis AXO of outer lens surface 13A on the object side toward the X direction with respect to optical axis AXL of inner lens surface 14A on the image side. Arrow TX represents the tilting of the optical axis of outer lens surface 13A on the object side toward the X direction with respect to optical axis AXL of inner lens surface 14A on the image side.

Here, in the right-handed XYZ coordinate system, the Y direction is the arrangement direction of first micro lenses 12A; the +Z direction is a direction from the object to the image; and +β (β being a number not smaller than zero) represents a direction in a clockwise rotation around the +Y direction axis as a positive tilt. First micro lens 12A is configured in such a manner that eccentricity EX of outer lens surface 13A is in the +X direction when tilt TX of outer lens surface 13A is in the +β direction, and that eccentricity EX of outer lens surface 13A is in the −X direction when tilt TX of outer lens surface 13A is in the −β direction.

FIG. 7C illustrates a cross-sectional configuration of second micro lens 12B. The lateral direction (Y direction) in FIG. 7C is the arrangement direction of the micro lenses. Optical axis AXL of inner lens surface 14B on the object side is in the longitudinal direction (Z direction) in FIG. 7C. Outer lens surface 13B as the first lens surface is disposed above inner lens surface 14B as the second lens surface. LED element 30 (see FIG. 3) as the object is disposed on the lower side in FIG. 7C. Arrow EY represents a shift (eccentricity) of optical axis AXO of outer lens surface 13B on the image side toward the Y direction from optical axis AXL of inner lens surface 14B on the object side. Arrow TY represents the tilting of the optical axis AXO of outer lens surface 13B on the image side toward the Y direction with respect to optical axis AXL of inner lens surface 14B on the object side.

Second micro lens 12B is configured in such a manner that eccentricity EY of outer lens surface 13BA is in the +Y direction when tilt TY of outer lens surface 13B is in the +α direction, and that eccentricity EY is in the −Y direction when tilt TY is in the −α direction.

FIG. 7D illustrates a cross-sectional configuration of second micro lens 12B. The lateral direction (X direction) in FIG. 7D is the width direction of lens unit 1. The longitudinal direction (Z direction) in FIG. 7D is the direction of optical axis AXL of inner lens surface 14A on the image side. Outer lens surface 13B as the first lens surface is disposed above inner lens surface 14B as the second lens surface. LED element 30 (see FIG. 3) as the object is disposed on the lower side in FIG. 7D. Arrow EX represents a shift (eccentricity) of optical axis AXO of outer lens surface 13B on the image side toward the X direction with respect to optical axis AXL of inner lens surface 14B on the object side. Arrow TX represents tilting of optical axis AXO of outer lens surface 13B on the image side toward the X direction with respect to optical axis AXL of inner lens surface 14B on the object side.

Second micro lens 12B is configured in such a manner that eccentricity EX of outer lens surface 13B is in the −X direction when tilt TX of outer lens surface 13B is in the +β direction, and that eccentricity EX is in the +X direction when tilt TX is in the −β direction.

(Light-Shield Plate)

Figure 8:
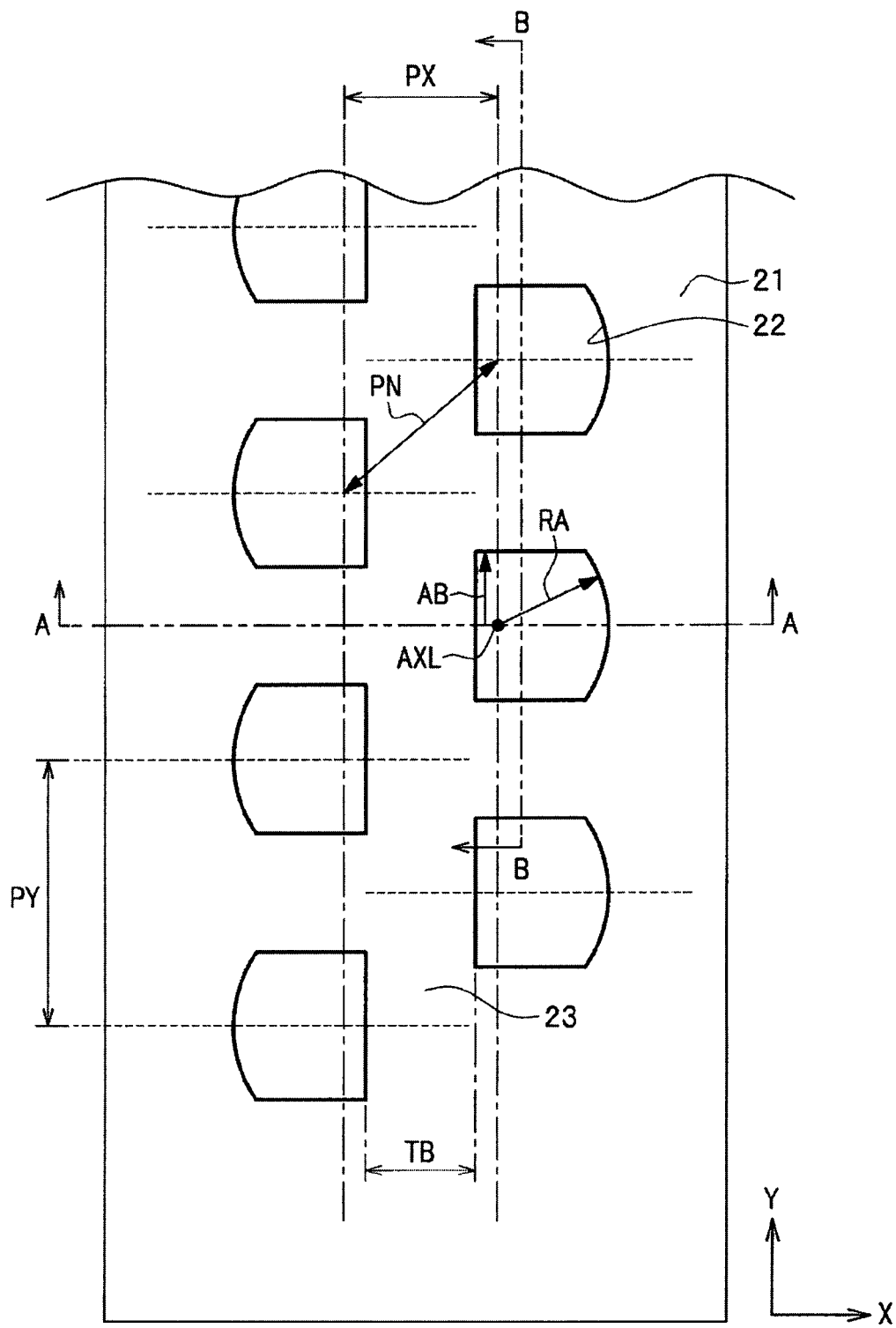
FIG. 8 is a top view of a light-shield plate according to the first embodiment.

Next the configuration of the light-shield plate according to the first embodiment is described with reference to FIG. 8. FIG. 8 is a top or plan view of light-shield plate 21 according to the first embodiment. Apertures 22 serving as diaphragms are formed in light-shield plate 21. Apertures 22 are formed on light-shield plate 21 at a pitch that is the same as those of first micro lenses 12A and second micro lenses 12B. Thus, apertures 22 in light-shield plate 21 are disposed in the zigzag pattern of two rows in the X direction. Light-shield plate 21 includes light-shield wall 23 formed within a range of TB that is defined as the thickness of light-shield wall 23.

Each aperture 22 has a shape formed by cutting a circle with radius RA with straight lines each being parallel to the width direction (X direction) of lens unit 1 and located at a distance of AB from the center of the circle with radius RA, and with a straight line being parallel to the arrangement direction of micro lenses 12A and 12B and located at a distance of TB/2 from the center of the circle with radius RA. Here, RA>AB, and RA>TB/2. The position of each optical axis AXL of inner lens surfaces 14A and 14B coincides with the center of the circle with radius RA forming a part of corresponding aperture 22.

Light-shield plate 21 is made of a material that blocks the light rays emitted from the light emission unit. Light-shield plate 21 of this embodiment is made of polycarbonate and is formed by injection molding. Among light rays from LED elements 30 as the objects, light-shield plate 21 transmits light rays contributing to the formation of image 30C (see FIG. 9) through apertures 22, and blocks light rays making no contribution to the formation of image 30C.

Figure 9:
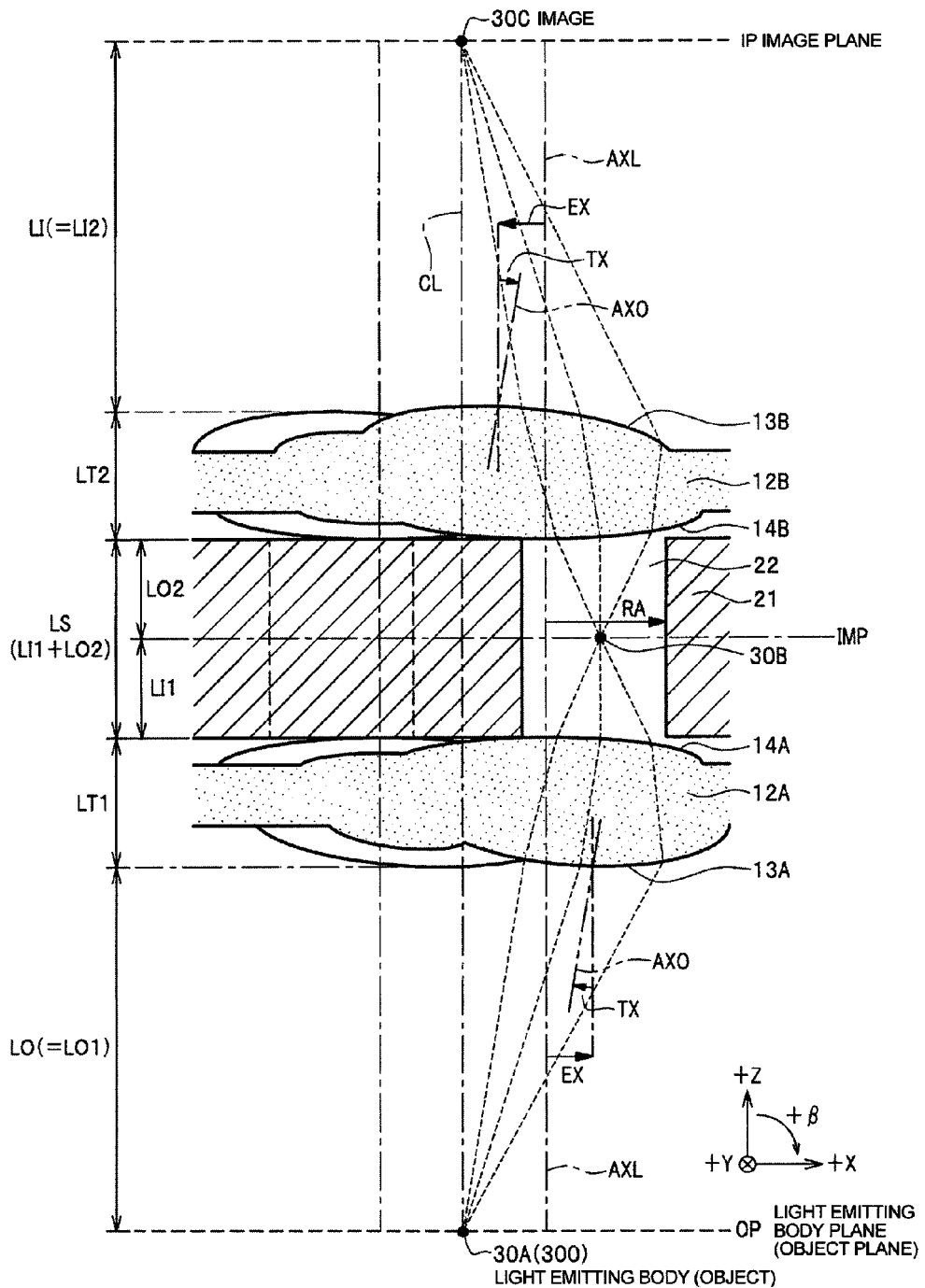
FIG. 9 is a vertical cross-sectional view of a lens unit according to the first embodiment, taken along a width direction (X direction).
Figure 10:
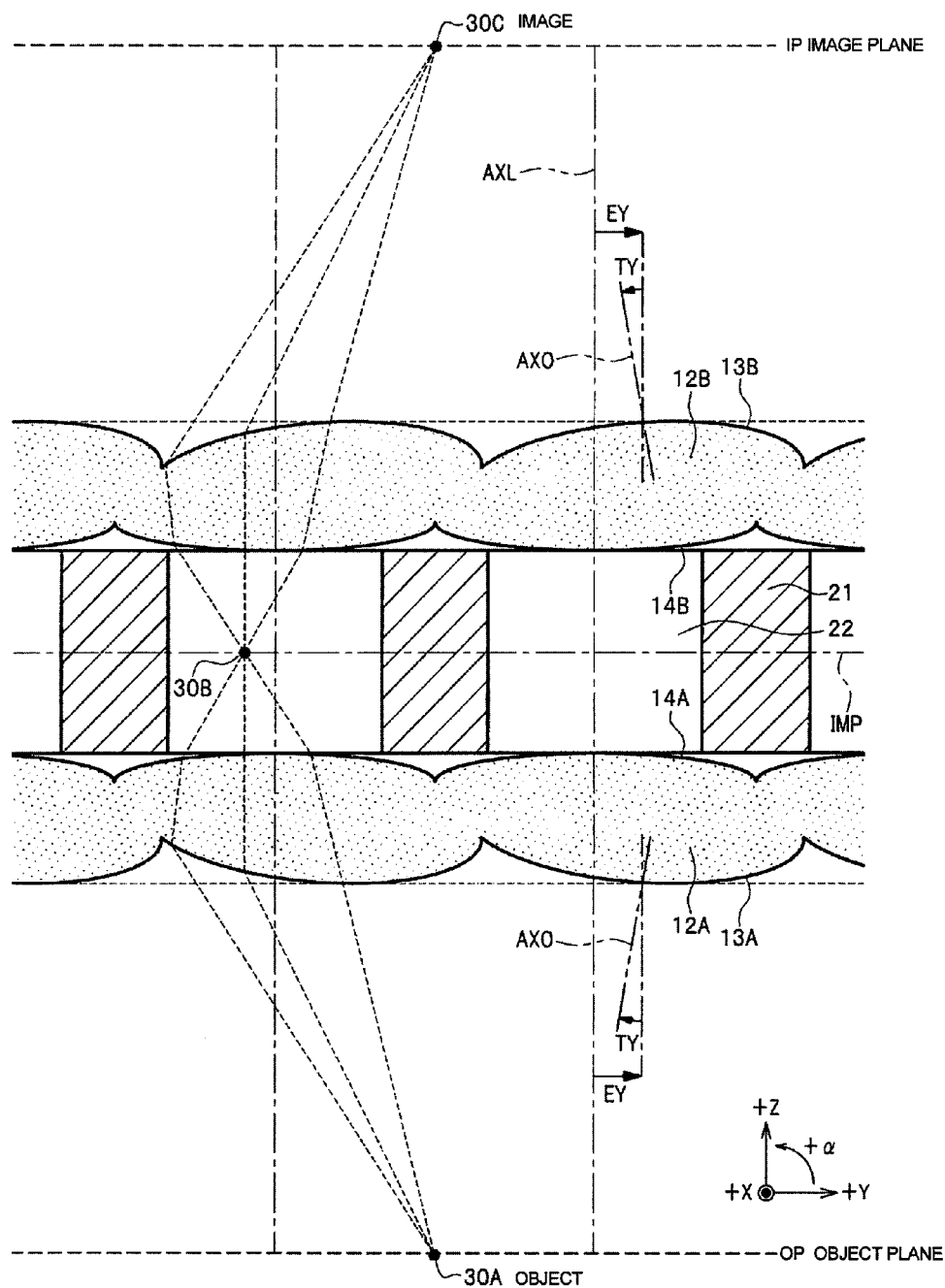
FIG. 10 is a vertical cross-sectional view of the lens unit according to the first embodiment taken along a longitudinal direction (Y direction).

Next image formation carried out by lens unit 1 will be described with reference to FIG. 9 and FIG. 10. FIG. 9 is a vertical cross-sectional view of lens unit 1 according to the first embodiment taken along the width direction (X direction). Specifically, FIG. 9 is a cross-sectional view at a position of the line A-A in FIG. 6 and FIG. 8. FIG. 10 is a vertical cross-sectional view of lens unit 1 according to the first embodiment taken along the longitudinal direction (Y direction). Specifically, FIG. 10 is a cross-sectional view at the position of the line B-B in FIG. 6 and FIG. 8.

As illustrated in FIG. 9, LED array 300 as objects 30A is disposed at an intersecting point between center line CL of the width direction (X direction) of lens unit 1 and object plane OP. First micro lens 12a is located in a position at distance LO away from object plane OP. Second micro lens 12B is disposed to be opposed to first micro lens 12A separated at interval LS, in such a manner that optical axis AXL of inner lens surface 14A of first micro lens 12A coincides with optical axis AXL of inner lens surface 14B of second micro lens 12B. Image 30C is formed at an intersecting point between center line CL of the width direction (X direction) of lens unit 1 and the image plane located at distance LI away from second micro lens 12B. The thickness of first micro lens 12A is LT1, and the thickness of second micro lens 12B is LT2.

In the right-handed XYZ coordinate system, the Y direction is the arrangement direction of first micro lenses 12A and 12B, the +Z direction is a direction from the object 30A to the image 30C, and +β (β being a number not smaller than zero) represents a direction in a clockwise rotation around the +Y direction axis as a positive tilt. Optical axis AXO of outer lens surface 13A of first micro lens 12A is eccentric in the +X direction with respect to optical axis AXL of inner lens surfaces 14A and 14B, and is tilted to a tilt TX in the +β direction. Meanwhile, optical axis AXO of outer lens surface 13B of second micro lens 12B is eccentric in the −X direction with respect to optical axis AXL of inner lens surfaces 14A and 14B, and is tilted to a tilt TX in the +β direction. Thus, outer lens surface 13A and outer lens surface 13B are eccentric in the opposite directions regarding the X direction, and are tilted in the same direction regarding the β direction.

As illustrated in FIG. 10, in the right-handed XYZ coordinate system, the Y direction is the arrangement direction of first micro lenses 12A and 12B, the +Z direction is a direction from the object 30A to the image 30C, and +α (α being a number not smaller than zero) represents a direction in a clockwise rotation around the +X direction axis as a positive tilt. Optical axis AXO of outer lens surface 13A of first micro lens 12A is eccentric EY in the +Y direction with respect to optical axis AXL of inner lens surfaces 14A and 14B, and is tilted TY in the −α direction. Meanwhile, optical axis AXO of outer lens surface 13B of second micro lens 12B is eccentric EY in the +Y direction and is tilted TY in the +α direction, with respect to optical axis AXL of inner lens surfaces 14A and 14B. Thus, outer lens surface 13A and outer lens surface 13B are eccentric in the same direction regarding the Y direction, and is tilted in the opposite directions regarding the α direction.

First micro lens 12A forms intermediate image 30B as a reduced inverted image of object 30A existing in a position located at distance LO1 away in the −Z direction therefrom. Intermediate image 30B is formed on intermediate image plane IMP located at distance LI1 away in the +Z direction from first micro lens 12A. Meanwhile, second micro lens 12B forms enlarged inverted image 30C of intermediate image 30B existing in a position located at distance LO2 away in the −Z direction therefrom. Enlarged inverted image 30C is formed on image plane IP located at distance LI2 away in the +Z direction from second micro lens 12B. As a result, image 30C is a same-size erect image of object 30A.

Distance LO between object plane OP of lens unit 1 and first lens unit 12A is set to be the same as distance L01. Interval LS between first micro lens 12A and second micro lens 12B is set be LS=LI1+LO2. Distance LI between second micro lens 12B and image plane IP of lens unit 1 is set to be the same as LI2.

First micro lens 12A and second micro lens 12B may be lenses having the same configuration. Here, both first micro lens 12A and second micro lens 12B have a thickness LT1. First micro lens 12A and second micro lens 12B are disposed opposed to each other with a surface being the same as outer lens surface 13A as the object-side curved surface of first micro lens 12A, being outer lens surface 13B as the image-side curved surface of second micro lens 12B Distance LO1 and distance LI2 are set to be the same, and distance LO and distance LI are set to be the same. Distance LO2 and distance LI1 are set to be the same, and interval LS between first micro lens 12A and second micro lens is set to be 2×LI1. This concludes the description on the configuration of the image formation apparatus according to the first embodiment.

<<Operation of Image Formation Apparatus>>
<Image Formation Operation of Image Formation Apparatus>

Next, an outline of an image forming operation of printer 100 as the image formation apparatus according to the first embodiment is described with reference to FIG. 1.

First of all, charging roller 42 to which a voltage is applied charges the surface of photoconductive drum 41. Then, along with the rotation of photoconductive drum 41, the charged portion of photoconductive drum 41 reaches a position near LED head 3. Subsequently, LED head 3 exposes the charged surface of photoconductive drum 41 to form an electrostatic latent image thereon. Thereafter, developer 5 develops the electrostatic latent image to form a toner image on the surface of photoconductive drum 41. The exposure operation by LED head 3 is described in detail later.

Meanwhile, feed roller 61 picks up paper 101 from paper cassette 60. Then, transport rollers 62 and 63 transport paper 101 picked up from paper cassette 60 to a position near transfer roller 80 and transfer belt 81. As photoconductor drum 41 rotates, the toner image on the surface of photoconductor drum 41 reaches a portion near transfer roller 80 and transfer belt 81. Thus, transfer roller 80 and transfer belt 81 to which the voltage is applied transfer the toner image formed on photoconductive drum 41 onto paper 101.

Then, transfer belt 81 rotates to transport paper 101 having the toner image formed on the surface to fixation unit 9. Thereafter, fixation unit 9 applies pressure and heat on the toner image formed on paper 101 so that the toner is melted and fixed on paper 101. After that, transport rollers 64 and discharge rollers 65 discharge paper 101 to discharge portion 7. This concludes the description on the image forming operation of printer 100.

<Exposure Operation of Exposure Unit>

Next, an outline of the exposure operation of LED head 3 as the exposure unit according to the first embodiment is described with reference to FIG. 4. Controller 89 (see FIG. 1) outputs a control signal to LED head 3 on the basis of image data received through external interface 97. Then, driver IC 31 of LED head 3 makes LED element 30 emit light at a desired intensity on the basis of the control signal output from controller 98. The light ray emitted from each LED element 30 of LED array 300 is incident on lens unit 1, whereby an image is formed on the surface of photoconductive drum 41. Thus, the portion on which the image is formed is exposed and the electrostatic latent image is formed. The image formation operation of lens unit 1 is described in detail next.

<Image Formation Operation of Lens Unit>

The image formation operation of lens unit 1 according to the first embodiment is described with reference to FIG. 9 and FIG. 10. As shown in FIG. 9, first micro lenses 12A forms a reduced inverted image of object 30A as intermediate image 30B on intermediate image plane IMP. Next, second micro lens 12B forms an enlarged inverted image of intermediate image 30B as image 30C on image plane IP. Image 30C is a same-size erect image of object 30A, and the direction (+X direction) of an arrow on object plane OP coincides with the direction (+X direction) of an arrow on image plane IP. In addition, main light rays from points on object plane OP are parallel to one another, i.e., telecentric, in a region between first micro lens 12A and second micro lens 12B. Light-shield plate 21 blocks light rays not contributing to the formation of image 30C among the light rays from object 30A.

As illustrated in FIG. 10, first micro lens 12A forms a reduced inverted image of object 30A as intermediate image 30B on intermediate image plane IMP. Next, second micro lens 12B forms an enlarged inverted image of intermediate image 30B as image 30C on image plane IP. Image 30C is a same-size erect image of object 30A. In addition, main light rays from points on object plane OP are parallel to one another, i.e., telecentric, in a region between first micro lens 12A and second micro lens 12B. Light-shield plate 21 blocks light rays not contributing to the formation of image 30C among the light rays from object 30A.

In lens unit 1, first micro lenses 12A, second micro lenses 12B and openings 22 are arranged at the same intervals. Thus, images 30C of all LED elements 30 as objects 30A arranged substantially linearly as LED array 300 can be formed on photoconductive drum 41 of printer 100.

Also in a case where first micro lens 12A and second micro lens 12B have the same configuration, first micro lens 12A forms a reduced inverted image of object 30A as intermediate image 30B on intermediate image plane IMP, and second micro lens 12B forms an enlarged inverted image of intermediate image 30B as image 30C on image plane IP. Image 30C is a same-size erect image of object 30A, and the direction (+X direction) of an arrow on object plane OP coincides with the direction (+X direction) of an arrow on image plane IP. In addition, main light rays from points on object plane OP are parallel to one another, i.e., telecentric, in a region between first micro lens 12A and second micro lens 12B.

<Operation of Micro Lens>

Figure 11A:
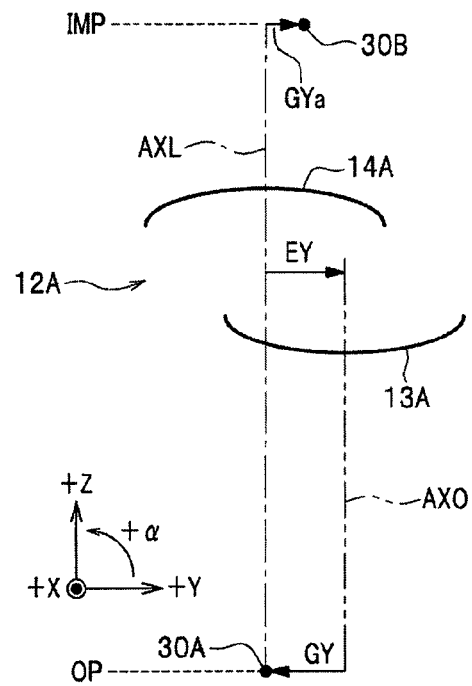
FIG. 11A is a schematic cross-sectional view of a first micro lens illustrated in FIG. 7A assumed to be eccentric but not tilted.
Figure 11B:
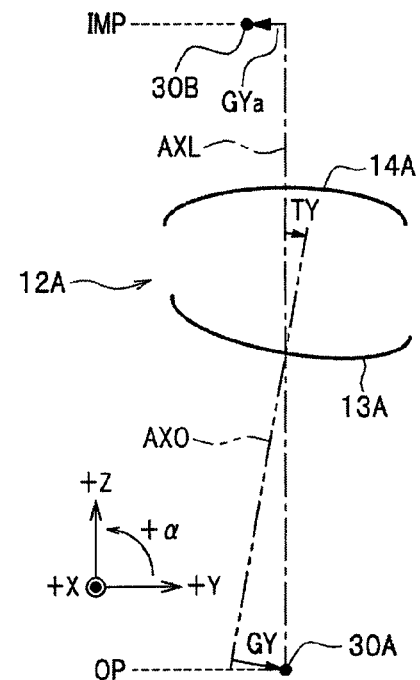
FIG. 11B is a schematic cross-sectional view of the first micro lens illustrated in FIG. 7A assumed to be tilted but not eccentric.
Figure 11C:
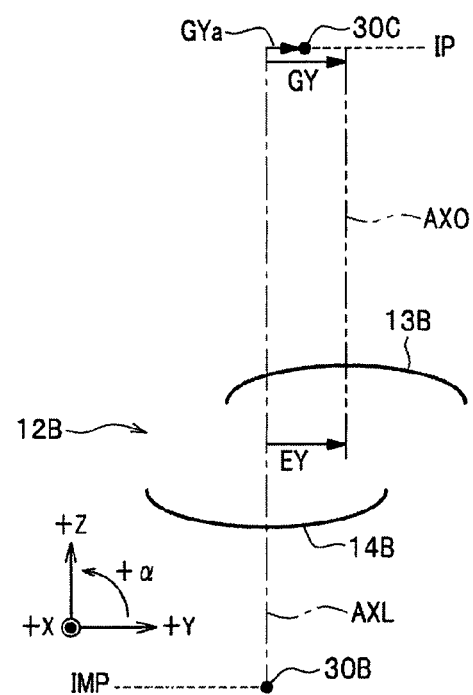
FIG. 11C is a schematic cross-sectional view of a second micro lens illustrated in FIG. 7C assumed to be eccentric but not tilted.
Figure 11D:
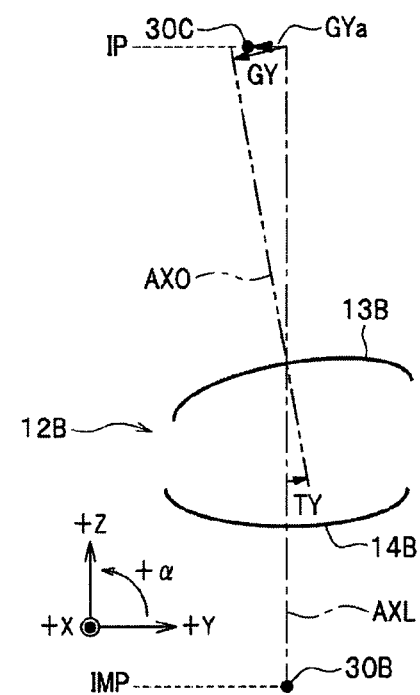
FIG. 11D is a schematic cross-sectional view of the second micro lens illustrated in FIG. 7C assumed to be tilted but not eccentric.

Next, operations of micro lenses 12A and 12B according to the first embodiment are described with reference to FIG. 11. FIG. 11 is a diagram illustrating operations of micro lenses 12A and 12B. FIG. 11A is a schematic cross-sectional view of first micro lens 12A illustrated in FIG. 7A assumed to be eccentric EY but not tilted to tilt TY. FIG. 11B is a schematic cross-sectional view of first micro lens 12A illustrated in FIG. 7A, assumed to have a tilt TY but not eccentric EY. FIG. 11C is a schematic cross-sectional view of second micro lens 12B illustrated in FIG. 7C assumed to be eccentric EY but not having a tilt TY. FIG. 11D is a schematic cross-sectional view of second micro lens 12B illustrated in FIG. 7C, assumed to have a tilt TY but not eccentric EY.

As in FIG. 7A and FIG. 7C, in FIG. 11, in the right-handed XYZ coordinate system, the Y direction is the arrangement direction of micro lenses 12A and 12B; the +Z direction is a direction from the object to the image, and +α (α being a number not smaller than zero) represents a direction in a clockwise rotation around the +X direction axis as a positive tilt.

In FIG. 11A, first micro lens 12A illustrated in FIG. 7A is assumed to be eccentric EY but not tilted TY. Assuming that object 30A is at a position located at distance GY away in the −Y direction from optical axis AXO of outer lens surface 13A on intermediate image plane IMP, intermediate image 30B is formed at a position located at distance GYa away in the +Y direction from optical axis AXL of inner lens surface 14A.

In FIG. 11B, first micro lens 12A illustrated in FIG. 7A is assumed to be tilted with a tilt TY and but not eccentric EY. Assuming that object 30A is at a position located at distance GY away in the +Y direction from optical axis AXO of outer lens surface 13A on intermediate image plane IMP, intermediate image 30B is formed at a position located at distance GYa away in the −Y direction from optical axis AXL of inner lens surface 14A.

As can be seen from FIG. 11A and FIG. 11B regarding micro lens 12A, displacement of intermediate image 30B due to eccentricity EY is in the direction opposite to the direction of the displacement of intermediate image 30B due to tilt TY. Thus, the eccentricities offset each other and thus, the displacement of intermediate image 30B is reduced. In FIG. 11A and FIG. 11B, the operation of micro lens 12A is described by an example using the longitudinal direction (Y direction) of lens unit 1. It is to be noted that the displacement of intermediate image 30B is also reduced in the width direction (X direction) of lens unit 1 with the eccentricities offsetting each other as in the longitudinal direction (Y direction).

In FIG. 11C, second micro lens 12B illustrated in FIG. 7C is assumed to be eccentric EY but not having a tilt TY. Assuming that an intersection point between image plane IP and optical axis AXO of outer lens surface 13B is at a position located at distance GY away in the +Y direction from optical axis AXL of inner lens surface 14B, image 30C is formed at a position located at distance GYa away in the +Y direction from optical axis AXL of inner lens surface 14B.

In FIG. 11D, second micro lens 12B illustrated in FIG. 7C is assumed to be tilted with a tilt TY but not eccentric EY. Assuming that an intersection point between image plane IP and optical axis AXO of outer lens surface 13B is at a position located at distance GY away in the −Y direction from optical axis AXL of inner lens surface 14B, image 30C is formed at a position located at distance GYa away in the −Y direction from optical axis AXL of inner lens surface 14B.

As can be seen from FIG. 11C and FIG. 11D, regarding second micro lens 12B, displacement of image 30C due to eccentricity EY is in the direction opposite to the displacement of image 30C due to tilt TY. Thus, the eccentricities offset each other and thus, the displacement of image 30C is reduced. In FIG. 11C and FIG. 11D, the operation of micro lens 12B is described by exemplary using the longitudinal direction (Y direction) of lens unit 1. It is to be noted that the displacement of image 30C is also reduced in the width direction (X direction) of lens unit 1 with the eccentricities offsetting each other as in the longitudinal direction (Y direction). This concludes the description of the image formation operation of the image formation apparatus according to the first embodiment.

As described above, lens plates 11A and 11B as the lens arrays according to the first embodiment are configured in such a manner that the displacement of the image of the object due to the tilting of the first lens surface with respect to the second lens surface is offset by the eccentricity of the first lens surface with respect to the second lens surface.

For example, in this embodiment, in the right-handed XYZ coordinate system, the Y direction is the arrangement direction of micro lenses 12A, the first lens surface is shifted in the −Z direction from the second lens surface, and +α (α being a number not smaller than zero) represents a direction in a clockwise rotation around the X direction axis as a positive tilt. Here, when the first lens surface is tilted by −α with respect to the second lens surface, the first lens surface is also eccentric in the +Y direction with respect to the second lens surface. Thus, eccentricity of the position at which the image (intermediate image) of the object is formed due to the tilting is offset by the eccentricity, and thus the resolution is prevented from being lowered.

Moreover, in this embodiment, in the right-handed XYZ coordinate system, the Y direction is the arrangement direction of micro lenses 12A, the first lens surface is shifted in the −Z direction from the second lens surface, and +β (β being the number not smaller than zero) represents a direction in a clockwise rotation around the +Y direction axis as a positive tilt. Here, when the first lens surface is tilted in +ρ with respect to the second lens surface, the first lens surface is also eccentric in +X direction with respect to the second lens surface. Thus, eccentricity of the position at which the image (intermediate image) of the object is formed due to the tilting is offset by the eccentricity, and thus the resolution is prevented from lowering.

Furthermore, with the configuration as in this embodiment, in lens unit 1, the eccentricity of the position at which the image is formed due to the tilting of the lens surface is reduced. Thus, resolution of lens unit 1 can be prevented from being lowered or reduced, an exposure image with high contrast can be formed with LED head 3, and a clear image without intensity irregularity and streaks can be formed with image formation apparatus 100. All things considered, the quality of the print image can be prevented from being degraded in image formation apparatus 100.

Second Embodiment

Printer 1000 as an image formation apparatus according to a second embodiment has a configuration of lens unit 110 different from that of lens unit 1 according to the first embodiment.

Configuration of Image Formation Apparatus According to Second Embodiment (Lens Unit)

The configuration of lens unit 110 according to the second embodiment is described. Lens unit 110 according to the second embodiment is different from lens unit 1 according to the first embodiment (see FIG. 5) in the configurations of first lens plate 11A and second lens plate 11B. In the description below, first lens plate 11A according to the second embodiment is referred to as "first lens plate 111A", while second lens plate 11B according to the second embodiment is referred to as "second lens plate 111B". In lens unit 110 according to the second embodiment, first lens plate 111A and second lens plate 111B have the same configuration. Thus, the description is given on first lens array 111A, and the detail description on second lens plate 111B is omitted.

(Lens Array)

Figure 12:
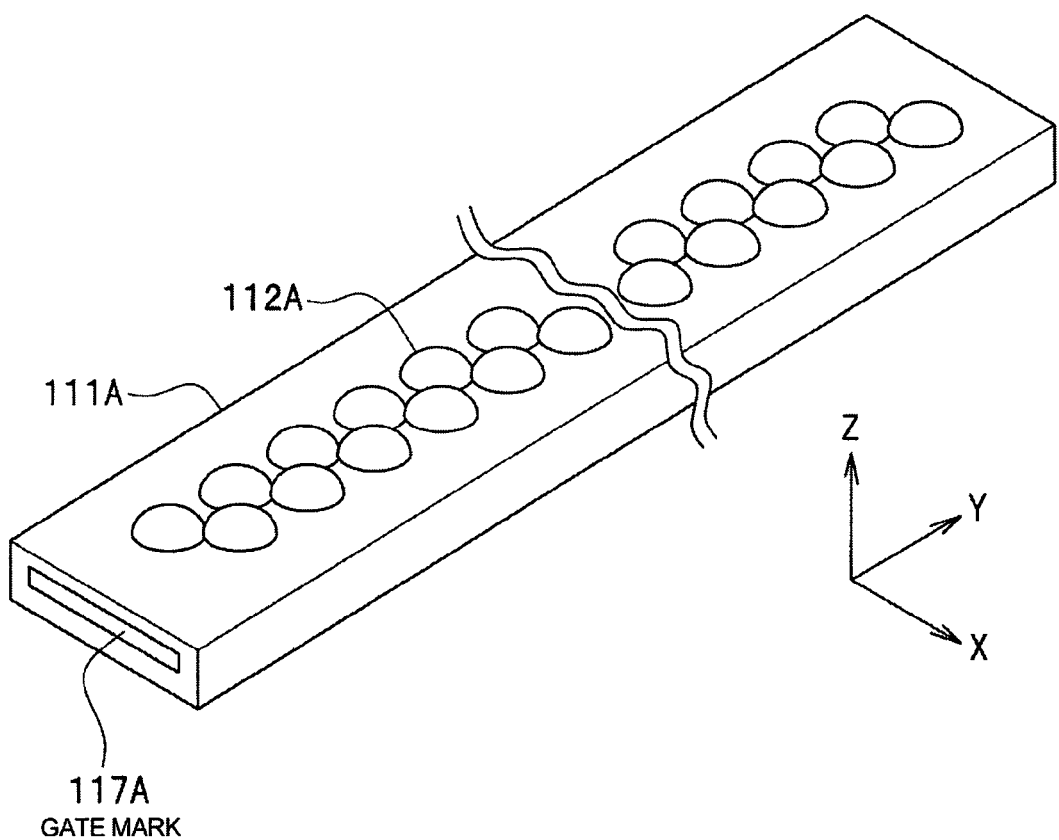
FIG. 12 is an external perspective view of a lens array according to a second embodiment.
Figure 13:
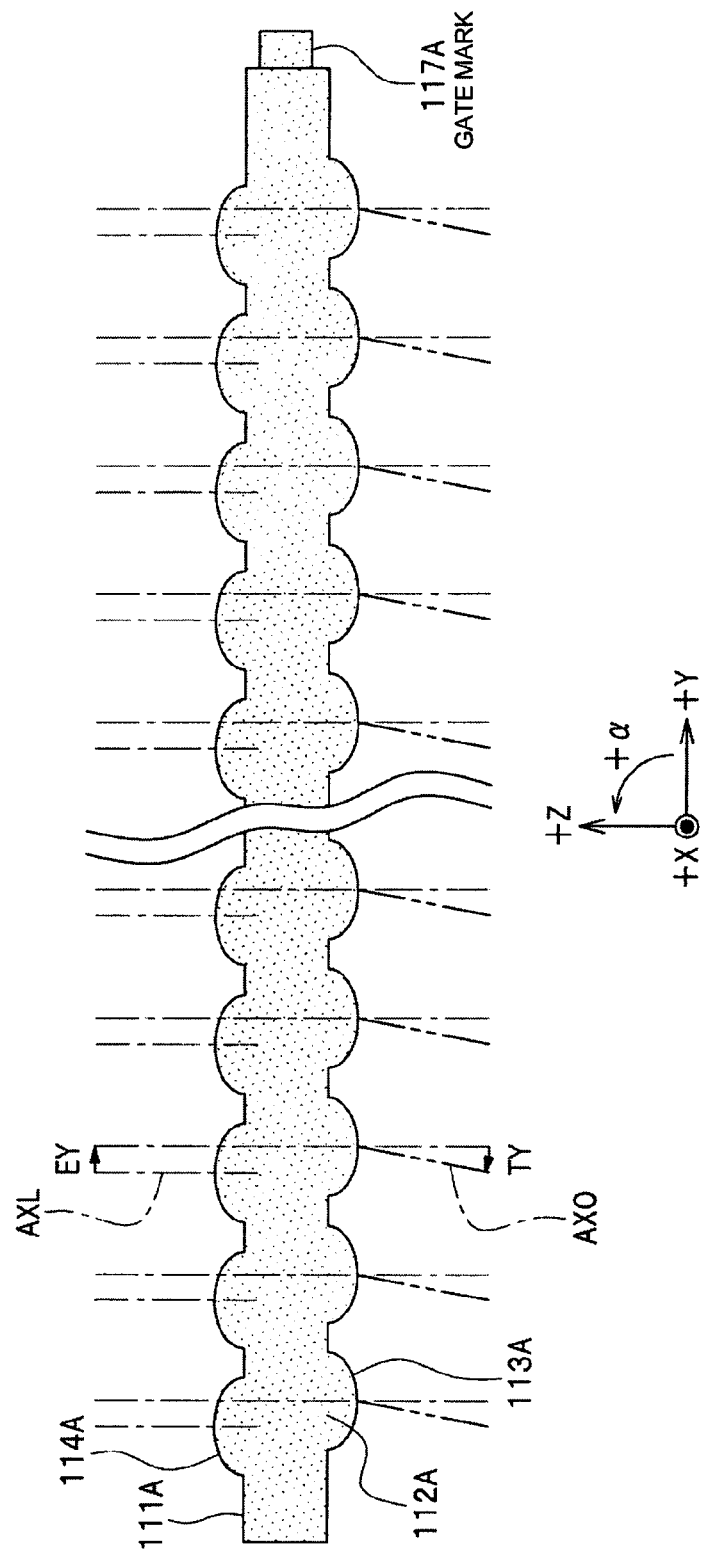
FIG. 13 is a vertical cross-sectional view of a first lens plate as the lens array according to the second embodiment.

The configuration of first lens plate 111A as a lens array according to the second embodiment is described with reference to FIG. 12 and FIG. 13. FIG. 12 is an external perspective view of first lens plate 111A as the lens array according to the second embodiment. FIG. 13 is a vertical cross-sectional view of first lens plate 111A as the lens array according to the second embodiment.

First lens plate 111A is disposed closer to LED elements 30 as objects 30A than second lens plate 111B. First lens plate 111A is integrally molded with first micro lenses 112A by injection molding. First micro lenses 112A are arranged in a zigzag pattern of two rows in the X direction as illustrated in FIG. 12. In first micro lens 112A, a lens surface on the side of LED elements 30 as the objects is referred to as outer lens surface 113A as a first lens surface, and a lens surface on the side of photoconductive drum 41 on which an image is to be formed is referred to as inner lens surface 114A as a second lens surface (see FIG. 13). AXO denotes an optical axis of outer lens surface 113A, while AXL denotes an optical axis of inner lens surface 114A.

Here, as illustrated in FIG. 13, in the right handed system of the XYZ coordinates, the Y direction is the arrangement direction of first micro lenses 112A; the +Z direction is a direction from object 30A to image 30C, and +α (α being a number not smaller than zero) represents a direction in a clockwise rotation around the X direction axis as a positive tilt. Here, optical axis AXL of inner lens surface 114A of first micro lens 112A is in the Z direction (vertical direction) in FIG. 13, and the arrangement direction of first micro lenses 112A is in the Y direction (lateral direction) in FIG. 13.

Optical axis AXO of outer lens surface 113A is eccentric with respect to optical axis AXL of inner lens surface 114A, and the eccentricity in the Y direction is represented by EY. Optical axis AXO of outer lens surface 113A is tilted with respect to optical axis AXL of inner lens surface 114A, and the tilting in the Y direction is represented by TY. The relationship between eccentricity EY and tilt TY is the same as that in the first embodiment.

Gate mark 117A as a burr formed in the injection molding of first lens plate 111A is formed at one end of first lens plate 111A in the Y direction. When gate mark 117A is located at an end in the +Y direction in FIG. 13, the tilt TY is in the −α direction and eccentricity EY is in the +Y direction. This concludes the description on the configuration of the image formation apparatus according to the second embodiment.

<<Configuration of Mold for Molding Lens Array>>

Figure 14:
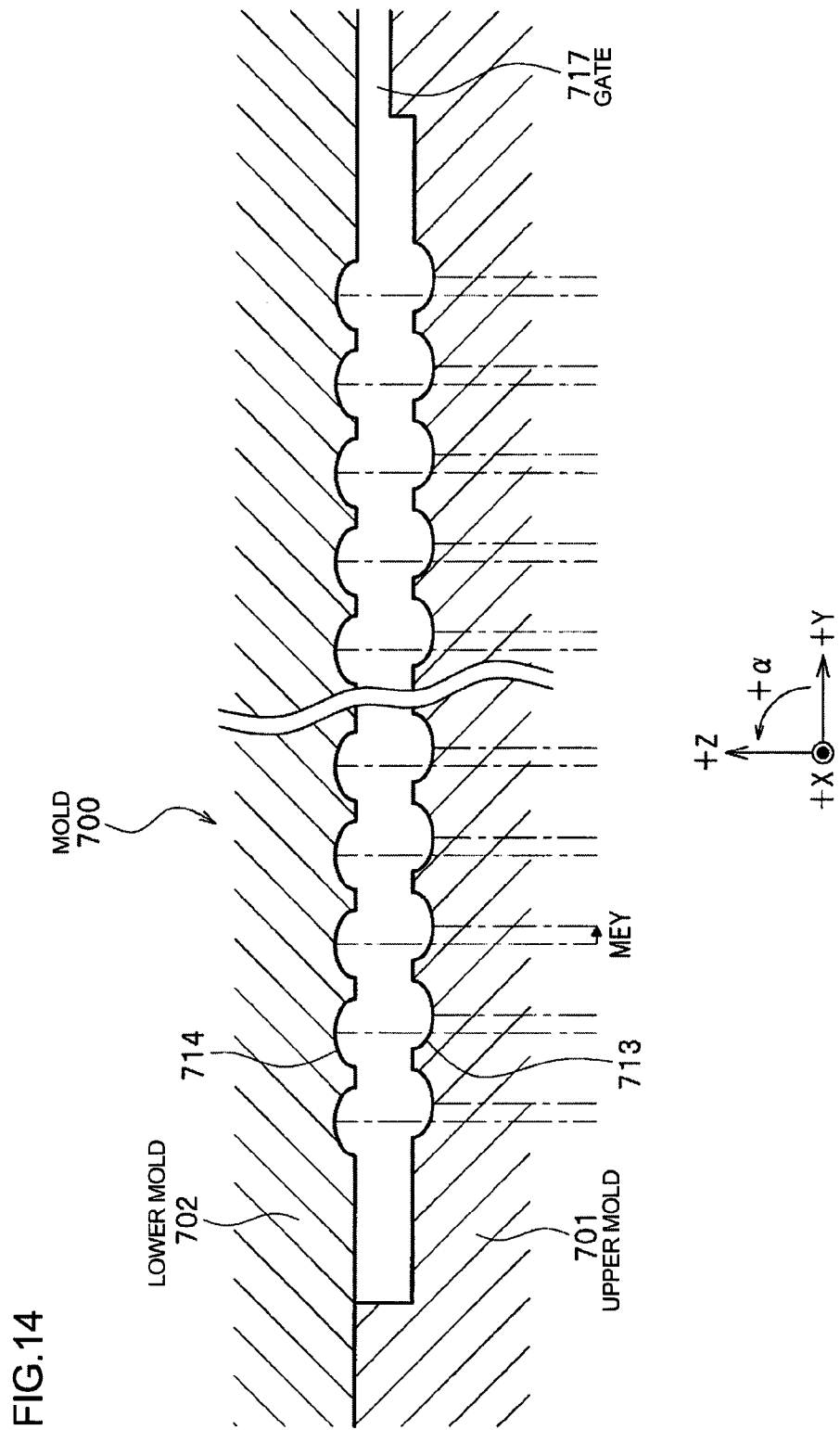
FIG. 14 is a vertical cross-sectional view of a mold for molding the lens array according to the second embodiment.

Next, a mold for molding first lens plate 111A as the lens array forming printer 1000 according to the second embodiment is described. FIG. 14 is a vertical cross-sectional view of mold 700 for molding first lens plate 111A and second lens plate 111B as the lens arrays according to the second embodiment.

Mold 700 as the mold for molding the lens array includes upper mold 702 as a first mold and lower mold 701 as a second mold. Outer curved surfaces 713 corresponding to shapes of outer lens surfaces 113A and 113B as the first lens surfaces are formed on lower mold 701. Thus, lower mold 701 defines the shapes of outer lens surfaces 113A and 113B. Inner curved surfaces 714 corresponding to shapes of inner lens surfaces 114A and 114B as the second lens surfaces are formed on upper mold 702. Thus, upper mold 702 defines the shapes of inner lens surfaces 114A and 114B. In FIG. 14, outer curved surfaces 713 are arranged in the Y direction (lateral direction) in FIG. 14.

Outer curved surfaces 713 of mold 700 are arranged in accordance with the arrangement of outer lens surfaces 113A and 113B, while inner curved surfaces 714 of mold 700 are arranged in accordance with the arrangement of inner lens surfaces 114A and 114B. Here, the outer curved surface 713 is eccentric (shifted) for distance MEY with respect to inner curved surface 714. Eccentricity distance MEY is in +Y direction when gate 717 is disposed in the +Y direction and outer curved surfaces 713 are shifted in the −Z direction (on the lower side) from inner curved surface 714.

A curvature of inner lens surface 114A as the second lens surface formed on upper mold 702 as the first mold is smaller than curvature of outer lens surface 113A as the first lens surface formed on lower mold 701 as the second mold. Thus, optical axis AXO of outer lens surface 113A of first lens plate 111A (see FIG. 13) tilts toward the opposite side (−Y direction) of the direction in which gate 717 is disposed with respect to optical axis AXL of inner lens surface 114A. This is described in detail along with a method for manufacturing the lens array.

Gate 717, through which a material of first lens plate 111A is injected, is formed on an end portion of mold 700 in the Y direction (lateral direction) in FIG. 13. Gate 717 is formed on the side of upper mold 702 as the first mold with which inner curved surface 714 is formed. This completes the description on the mold for molding the lens array according to the second embodiment.

<<Method for Manufacturing Lens Array>>

Figure 15:
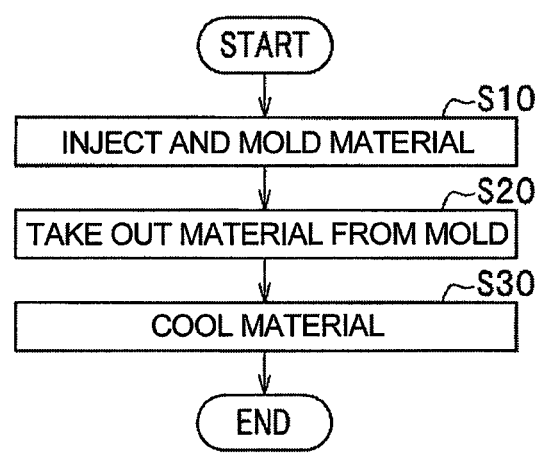
FIG. 15 is a flow chart of a flow of operations for manufacturing the lens array according to the second embodiment.

Next, the method for manufacturing first lens plate 111A as the lens array according to the second embodiment is described. FIG. 15 is a flowchart illustrating a flow of operations for manufacturing first lens array 111A and second lens plate 111B as the lens arrays according to the second embodiment.

In mold 700 as the mold for molding the lens array shown in FIG. 14, a space (cavity) is formed between outer curved surface 713 and inner curved surface 714 when lower mold 701 and upper mold 702 are combined. First of all, a softened material is injected into the space through gate 717 by means of a molding machine (Step S10). Here, the molding machine applies high pressure to the injected material. The pressure is applied in the direction from gate 717 illustrated in FIG. 14 to the other end portion (−Y direction). Thus, in the material that flowed into outer curved surface 713, inner stress is produced that attempts to bring an apex of outer curved surfaces 713 (apex of outer lens surfaces 113A) down in a direction in which the pressure is applied. Specifically, the inner stress in the −α direction in FIG. 13 acts on the apex of outer lens surfaces 113A of first lens plate 111A.

Next, upper mold 702 and lower mold 701 are separated from each other, and first lens plate 111A formed by injection molding is taken out from mold 700 (Step S20). At this point, the material of first lens plate 111A is at a relatively high temperature and thus is not cured yet. Thus, outer lens surface 113A of first lens plate 111A thus molded is tilted toward the −α direction so as to release the inner stress acting on the apex of outer lens surfaces 113A of first lens plate 111A in the −α direction. As the cooling proceeds, outer lens surface 113A is gradually cured while being inclined in the −α direction (Step S30).

As in the case of outer lens surface 113A, in the material that flowed into inner curved surface 714, inner stress is produced that attempts to bring an apex of inner curved surfaces 713 (inner lens surfaces 114A) down in a direction in which the pressure is applied. Specifically, the inner stress in the +α direction in FIG. 13 acts on the apex of inner lens surfaces 114A of first lens plate 111A. When upper mold 702 and lower mold 701 are separated from each other, the material of first lens plate 111A is at a relatively high temperature and thus is not cured yet. Thus, inner lens surface 114A of first lens plate 111A thus molded is tilted toward the +α direction so as to release the inner stress acting in the +α direction. As the cooling proceeds, inner lens surface 114A is gradually cured while being inclined in the +α direction. Still, the curvature of inner lens surface 114A as the second lens surface formed in upper mold 702 as the first mold is smaller than the curvature of outer lens surface 113A as the first lens surface formed in lower mold 701 as the second mold. Thus, the tilting of inner lens surface 114A can be ignored.

As a result, tilt TY in the −α direction with respect to inner lens surface 114A is formed in outer lens surface 113A of first lens plate 111A (see FIG. 13). Outer curved surface 713 of mold 700 is configured to be eccentric distance MEY with respect to inner curved surface 714. Thus, outer lens surface 113A of first lens plate 111A is eccentric in the +Y direction with respect to inner lens surface 114A (see FIG. 13). Accordingly, in first lens plate 111A as the lens array according to the second embodiment, the eccentricity and tilting produced are similar (in the Y direction) to those in first lens plate 11A according to the first embodiment.

To verify the effect of the lens unit according to the second embodiment, a description is given of first lens plate 111A and second lens plate 111B forming the lens unit and manufactured with the method for manufacturing the lens array according to the second embodiment. Table 1 illustrates the dimensions of various portions of the lens unit thus created.

TABLE 1

| constituents | items | portions | values (mm) |
| --- | --- | --- | --- |
| lens unit | surface intervals | LO | 3.3 |
| | | LT1 | 1.3 |
| | | LS | 2.2 |
| | | LT2 | 1.3 |
| | | LI | 3.3 |
| lens plate | lens arrangement intervals | PY | 1.2 |
| | | PX | 0.8 |
| light-shield plate | dimensions of aperture 22 | RA | 0.5 |
| | | AB | 0.4 |
| | thickness of light-shield wall | TB | 0.4 |
| lens radii | outer lens 113A | RL | 0.7 |
| | inner lens 113B | RL | 0.7 |
| | outer lens 113A | RL | 0.7 |
| | inner lens 113B | RL | 0.7 |

| constituents | items | coefficients | values |
| --- | --- | --- | --- |
| first micro lens 112A | outer lens surface 113A | CR | 0.8431 |
| | | A | −0.3031 |
| | | B | 0.3825 |
| | | C | −0.7052 |
| | inner lens surface 114A | CR | −1.130 |
| | | A | 0.4494 |
| | | B | 0.1655 |
| | | C | 0.9536 |

TABLE 1-continued

| second micro lens 112B | outer lens surface 113B | CR<br>A<br>B<br>C | −0.8431<br>0.3031<br>−0.3825<br>0.7052 |
|---|---|---|---|
| | inner lens 113B | CR<br>A<br>B<br>C | 1.130<br>−0.4494<br>−0.1655<br>−0.9536 |

A material used for first lens plate 111A and second lens plate 111B forming the lens unit is a cycloolefin optical resin, or namely, ZEONEX (registered trademark) E48R (manufactured by Zeon Corporation) and the glass-transition temperature is 139° C. As a pre-processing of the injection molding, the material to be used in the injection molding is dried in a vacuum for four hours at a temperature of 100° C., and then is cooled to a normal temperature in a nitrogen gas atmosphere.

The injection molding machine used for the injection molding has a screw diameter of 26 mm, a nozzle diameter of 2.5 mm, and a mold clamping force of 1000 KN. The injection molding is measured with a screw rotation speed of 80 rpm, and a back pressure of 80 kg/cm².

Temperatures of a heat sleeve are set to be 275° C., 280° C., 280° C., and 260° C. at a nozzle, a front portion, a middle portion, and a rear portion, respectively. The temperature may be 270 to 300° C. at the nozzle, the front portion, and the middle portion, and 250 to 280° C. at the rear portion. The injection speed is set to be 70 mm/second, but may also be 20 to 200 mm/second. Pressure at the start of pressure keeping is 1200 kg/cm², and pressure keeping time is 7 seconds, but may also be 1000 to 1500 kg/cm² and 3 to 10 seconds, respectively. A molding cycle is 90 seconds.

Tilt TY of outer lens surface 113A of lens plate 111A obtained by the injection mold with respect to inner lens surface 114A of lens plate 111A is measured to have a tilt TY=0.1° toward the −α direction in FIG. 13. Tilt TY is measured with Ultrahigh Accurate 3-D Profilometer UA-3P (manufactured by Panasonic).

Lens plates 111A and 111B of lens unit 110 of this embodiment are newly made by injection molding with an eccentricity distance MEY of mold 700 being 0.002. A result of measuring eccentricity EY of lens plates 111A and 111B after injection molding is EY=0.002. The eccentricity EY is measured by using Ultrahigh Accurate 3-D Profilometer UA-3P (manufactured by Panasonic). Similar effects can be obtained if MEY is in the range of "0.1% to 0.8%" of lens diameter RL.

Next, a result of measuring the performance of lens unit 110 thus created is described. The performance of lens unit 110 is measured by using lens unit 110 in which LED elements 30 are disposed at a pitch PD of 0.042. Thus, 600 LED elements 30 are arranged in every inch (about 25.4 mm), and a so-called resolution is 600 dpi (dots per inch).

First of all, the modulation transfer function (MTF) indicating the resolution of an LED image formed by LED head 3 equipped with created lens unit 110 is measured. The result is "92%". The MTF is an indicator of the contrast in image 30C of LED head 3. The contrast is at the maximum of 100% and lowers with a lowering percentage. The MTF is determined by the following numerical expression 3, where IMAX is the maximum value of a luminance of the image, and IMIN is the minimum luminance between two adjacent images 30C.

[Numerical Expression 3]

$$MTF = \frac{IMAX - IMIN}{IMAX + IMIN} \times 100 \qquad \text{Formula 3}$$

In the measurement of MTF, LED head 3 in which LED elements 30 are disposed at pitch PD of 0.042 is used, LED elements 30 are lit in such a pattern that while one of LED elements 30 are lit, one adjacent LED element 30 is unlit, and image 30C on image plane IP is captured by a CCD camera. Then, the luminance distribution is analyzed.

Figure 16:
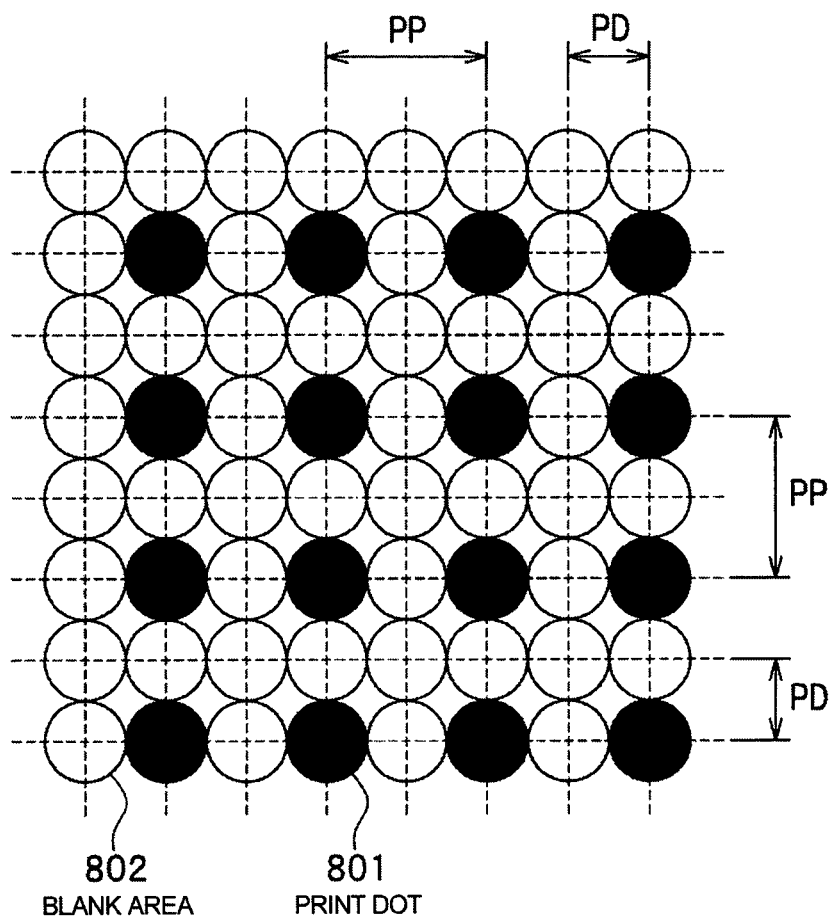
FIG. 16 is a diagram illustrating an evaluation of a print image created by an image formation apparatus according to the second embodiment.

A print image is evaluated using printer 1000 equipped with created lens unit 110. The result shows that a favorable image is obtained with lens unit 110 according to the second embodiment. The evaluation of the print image created by printer 1000 is described by using FIG. 16. Printer 1000, in which LED elements 30 are arranged at pitch PD of 0.042, is used for the evaluation of the print image. As illustrated in FIG. 16, the print image includes print dots 801 and blank areas 802. Each print dot 801 is a toner image, and blank area 802 is an area in which no toner is attached so that the surface of the print paper is exposed. A print image for evaluation is created by alternately arranging print dots 801 and blank areas 802 with pitch PP between every two adjacent print dots being 0.084. This concludes the description of the method for manufacturing the lens array according to the second embodiment.

As described above, with the method for manufacturing the lens array according to the second embodiment, the lens array can be formed in such a manner that the resolution is prevented from being reduced or lowered even when the lens surface is tilted.

Third Embodiment

In the first embodiment, the case where the lens array is used in the image formation apparatus is described. In a third embodiment, the case is described where the lens array is used in a reading apparatus.

<<Configuration of Reading Apparatus>>

Figure 17:
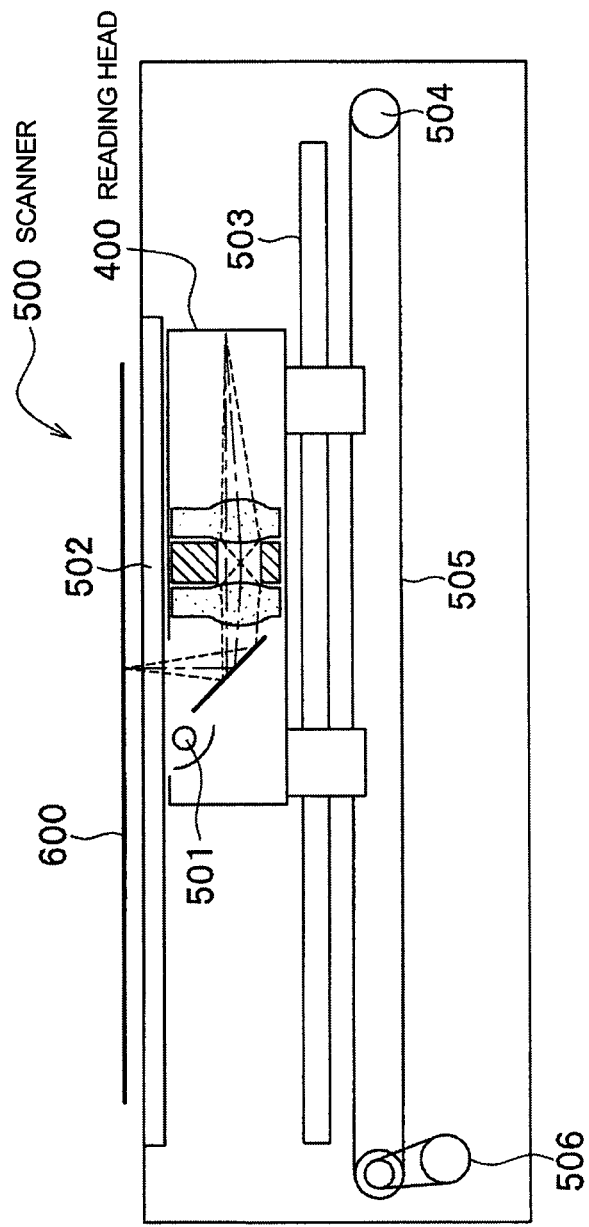
FIG. 17 is a vertical cross-sectional view of a reading apparatus according to a third embodiment.

The configuration of scanner 500 as a reading apparatus according to the third embodiment is described with reference to FIG. 17. FIG. 17 is a vertical cross-sectional view of scanner 500 as the reading apparatus according to the third embodiment.

Scanner 500 as the reading apparatus generates electrical data of original document 600. Reading head 400 captures the light rays reflected by the surface of original document 600 and converts the light rays into electronic data. Reading head 400 is movably disposed on rail 503. Original document 600 is placed on platen 502 made of a material that transmits a visible light ray. Lamp 501 as a lighting device is disposed in such a manner that the light rays emitted therefrom are reflected on the surface of original document 600 to be captured by reading head 400. A portion of reading head 400 is connected to drive belt 505, which is wound around rollers 504. Motor 506 drives drive belt 505 to move reading head 400.

Figure 18:
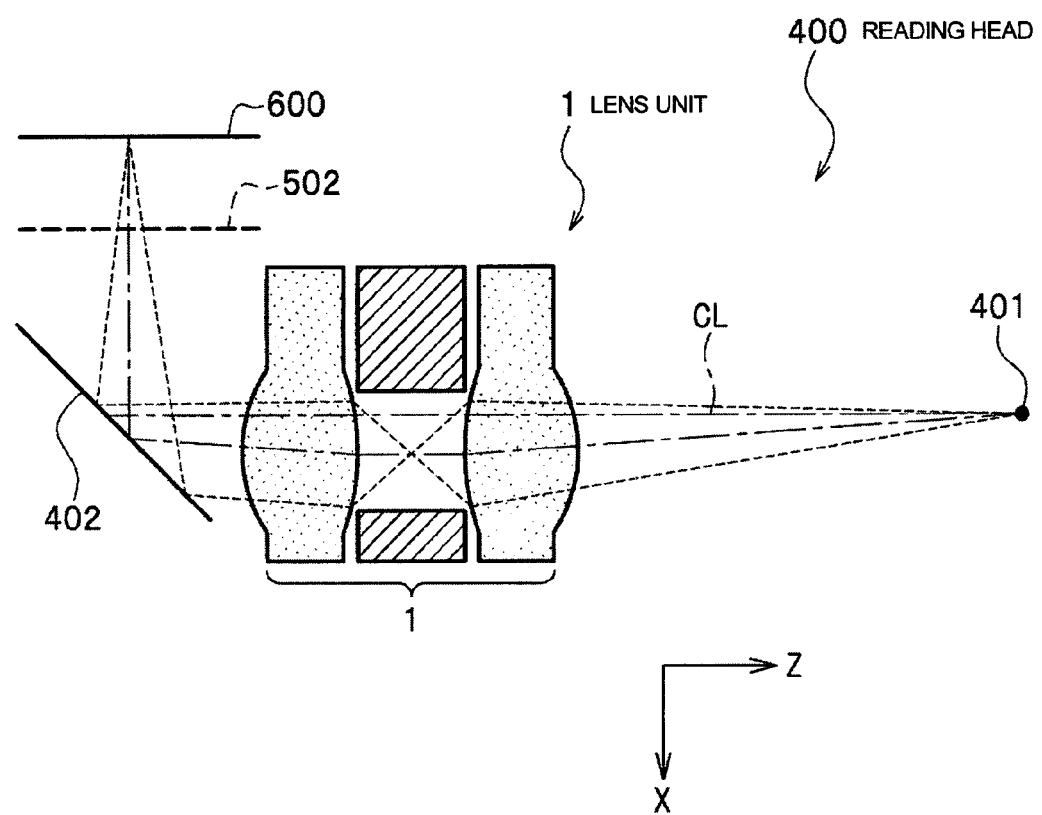
FIG. 18 is a vertical cross-sectional view of a reading head according to the third embodiment.

Next, the configuration of reading head 400 according to the third embodiment is described with reference to FIG. 18. FIG. 18 is a vertical cross-sectional view of reading head 400 according to the third embodiment. Here, a lens unit forming reading head 400 according to the third embodiment may have the same configuration as lens unit 1 according to the first embodiment or lens unit 110 according to the second embodiment. Here, the case is described where the lens unit has the same configuration as lens unit 1 according to the first embodiment.

Mirror 402 is configured to bend an optical path of a light ray reflected by original document 600. Lens unit 1 forms an image based on original document 600. Line sensor 401 includes light receiving elements arranged substantially linearly, and converts the image of original document 600 into an electric signal.

Figure 19:
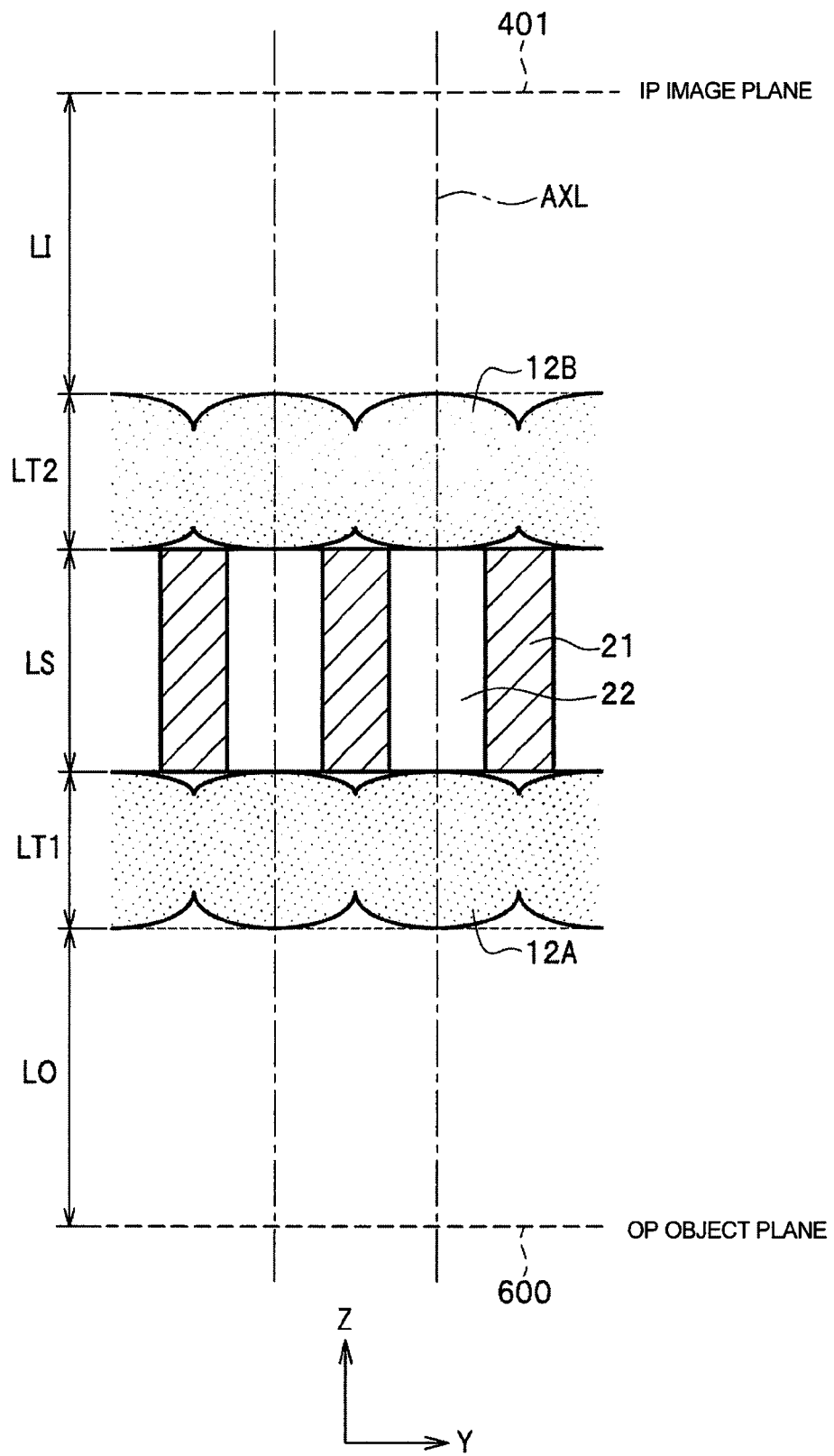
FIG. 19 is an enlarged vertical cross-sectional view of the reading head according to the third embodiment.

FIG. 19 illustrates a configuration in a case where lens unit 1 according to the first embodiment is used for scanner 500 as the reading apparatus. FIG. 19 is an enlarged vertical cross-sectional view of reading head 400 according to the third embodiment. In this embodiment, reading head 400 is disposed in such a manner that object plane OP of lens unit 1 is aligned with original document 600 and image plane IP is aligned with line sensor 401.

<<Operation of Reading Apparatus>>
<Reading Operation of Reading Apparatus>

A reading operation by scanner 500 as the reading apparatus according to the third embodiment is described with reference to FIG. 17. When lamp 501 is lit, the light ray radiated from lamp 501 reflects on a surface of original document 600. Meanwhile, motor 506 drives drive belt 505 to move reading head 400 and lamp 501 in a lateral direction in FIG. 17. Thus, reading head 400 captures light rays reflected from the entire surface of the original document.

<Operation of Reading Head>

Next, an operation of reading head 400 is described with reference to FIG. 18. The light ray reflected by original document 600 passes through platen 502 and the optical path of the light ray is bent by mirror 402 so that the light ray is incident on lens unit 1. The image of original document 600 is formed on line sensor 401 by lens unit 1. Line sensor 401 converts the image of document 600 into an electric signal. This completes the description on the operation of the reading apparatus according to the third embodiment.

As described above, in scanner 500 as the reading apparatus according to the third embodiment, a lowering of the resolution due to the tilting of the lens surface is prevented. Thus, the image data allowing an exact reproduction of an original document can be obtained.

[Modifications]

The invention is not limited to the embodiments described above, and can be implemented in various ways without departing from the gist of the invention. Modifications of the embodiments are described below.

(First Lens Surface and Second Lens Surface)

In the first embodiment, outer lens surface 13A as the first lens surface and inner lens surface 14A as the second lens surface of first micro lens 12A, as well as outer lens surface 13B as the first lens surface and inner lens surface 14B as the second lens surface of second micro lens 12B may have a spherical surface. Alternatively, these lens surfaces may be curved surfaces, such as an anamorphic aspheric surface, a surface formed from an XY polynomial expression, a parabolic surface, an elliptical surface, a hyperboloid surface, and a Korenich surface. The same applies to the second embodiment and the third embodiment.

(Lens Array)

In the first embodiment, first lens plate 11A and second lens plate 11B as the lens arrays are made by molding using a metal mold. Alternatively, molding using a resin mold may be employed. Furthermore, first lens plate 11A and second lens plate 11B may be made by cutting work. In the first embodiment, a resin is used as the material for first lens plate 11A and second lens plate 11B. Alternatively, glass may be used. The same applies to the second embodiment and the third embodiment.

(Light-Shield Plate)

In the first embodiment, light-shield plate 21 is made by injection molding using a polycarbonate, but this should not be construed in a limiting sense. Light-shield plate 21 may be made by cutting work, or by etching a metal piece. The same applies to the second embodiment and the third embodiment.

(Exposure Unit)

In the first embodiment, LED array 300 in which LED elements 30 as the light emitting bodies are disposed is used as exposure unit 300. Alternatively, an organic EL may serve as the light emitting unit, and the exposure unit may employ a laser. The same applies to the second embodiment.

(Mold)

In the second embodiment, in mold 700, outer curved surface 713 and inner curved surface 714 are eccentric with each other in the direction of gate 717. Alternatively, instead of making mold 700 itself eccentric, upper mold 702 and lower mold 701 may be shifted from each other after the material is injected into mold 700 so that outer curved surface 713 and inner curved surface 714 are eccentric with each other in the direction of gate 717.

(Reading Apparatus)

In the third embodiment, a description is given with scanner 400 as an example of the reading apparatus configured to convert original document 600 into electronic data. Alternatively, the reading apparatus may be a sensor and a switch configured to convert an optical signal into an electric signal, as well as an input-output device, a biometrics authentication device, a communication device, a sizer, and the like using the same.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations, including the meaning and range within equivalent arrangements of the claims, are intended to be embraced in the invention.

The invention claimed is:

1. A lens array comprising:
a lens including a first lens surface and a second lens surface, wherein
the first lens surface is formed to tilt at a predetermined tilt angle with respect to the second lens surface, and
the first lens surface is formed to be eccentric by an eccentric distance in such a direction that the optical axis of the second lens surface and an optical axis of the first lens surface intersect on a side of the first lens surface,
wherein the eccentric distance is determined such that a distance of displacement of an image due to a tilting of the first lens surface substantially matches a distance of displacement of an image due to an eccentricity of the first lens surface.

2. The lens array comprising:
a plurality of lenses, each of the lenses being the lens according to claim 1, wherein
the lenses are arranged substantially linearly in a direction orthogonal to an optical axis of the second lens surface.

3. The lens array according to claim 2, wherein
the first lens surface tilts in a $-\alpha$ direction with respect to the second lens surface and the first lens surface is eccentric in a $+Y$ direction with respect to the second lens surface, where, in a right-handed XYZ coordinate system, a Y direction is the arrangement direction of the lenses, the first lens surface is disposed at a position shifted in a −Z direction from the second lens surface, and a +α direction is a direction of a clockwise rotation around a +X direction axis, α being a number not smaller than 0.

4. The lens array according to claim 2, wherein the first lens surface tilts toward a +β direction with respect to the second lens surface and the first lens surface is eccentric in a +X direction with respect to the second lens surface, where, in a right-handed XYZ coordinate system, a Y direction is the arrangement direction of the lenses, the first lens surface is disposed at a position shifted in a −Z direction from the second lens surface, and a +β direction is a direction of a clockwise rotation around a +Y direction axis, β being a number not smaller than 0.

5. The lens array according to claim 2, wherein a gate mark in which a shape of an inlet for a material of the lens array is defined is formed at an end portion of the lens array in a +Y direction, and the first lens surface is eccentric in the +Y direction with respect to the second lens surface, where, in a right-handed XYZ coordinate system, a Y direction is the arrangement direction of the lenses and the first lens surface is disposed at a position shifted in a −Z direction from the second lens surface.

6. A lens unit comprising:
the lens array according to claim 2; and
a light-shield plate formed with apertures through which light rays from the lens array can transmit.

7. An exposure unit comprising the lens array according to claim 1.

8. An image formation apparatus comprising the lens array according to claim 1.

9. A reading apparatus comprising the lens array according to claim 1.

10. A lens array comprising:
a lens including a first lens surface and a second lens surface, wherein
the first lens surface is formed to tilt at a predetermined tilt angle with respect to the second lens surface, and
the first lens surface is formed to be eccentric by an eccentric distance in such a direction that the optical axis of the second lens surface and an optical axis of the first lens surface intersect on a side of the first lens surface,
wherein a curvature of the second lens surface is smaller than a curvature of the first lens surface.

11. A LED head comprising:
a lens array, the lens array including:
a lens including a first lens surface and a second lens surface, wherein
the first lens surface is formed to tilt at a predetermined tilt angle with respect to the second lens surface, and
the first lens surface is formed to be eccentric by an eccentric distance in such a direction that the optical axis of the second lens surface and an optical axis of the first lens surface intersect on a side of the first lens surface.

12. A method for manufacturing a lens array by using a mold including a first mold configured to define a first lens surface, a second mold configured to define a second lens surface, and a gate through which a material is to be injected into a cavity formed between the first mold and the second mold, the method comprising:
molding the material while the first lens surface and the second lens surface are displaced from each other in a direction of the gate;
determining an eccentric distance such that a distance of displacement of an image due to a tilting of the first lens surface substantially matches a distance of displacement of an image due to an eccentricity of the first lens surface; and
forming the first lens surface of the lens array and the second lens surface of the lens array using the first mold and the second mold such that the first lens surfaces is tilted at a predetermined tilt angle with respect to the second lens surface, and in which the first lens surface is eccentric by the eccentric distance in such a direction that an optical axis of the second lens surface and an optical axis of the first lens surface intersect on a side of the first lens surface.

13. The method for manufacturing a lens array according to claim 12, wherein a curvature of the second lens surface is smaller than a curvature of the first lens surface.

14. A lens array formed by the method according to claim 12.

15. An LED head comprising the lens array according to claim 14.

16. An image formation apparatus comprising the lens array according to claim 14.

* * * * *